(12) United States Patent
Bae et al.

(10) Patent No.: US 12,520,422 B2
(45) Date of Patent: Jan. 6, 2026

(54) FOLDABLE ELECTRONIC DEVICE INCLUDING FLEXIBLE PRINTED CIRCUIT BOARD

(71) Applicant: SAMSUNG ELECTRONICS CO., LTD., Suwon-si (KR)

(72) Inventors: Seyoon Bae, Suwon-si (KR); Yongyoun Kim, Suwon-si (KR); Joon Heo, Suwon-si (KR); Chanhee Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 18/055,997

(22) Filed: Nov. 16, 2022

(65) Prior Publication Data

US 2023/0096714 A1 Mar. 30, 2023

Related U.S. Application Data

(63) Continuation of application No. PCT/KR2022/013152, filed on Sep. 2, 2022.

(30) Foreign Application Priority Data

Sep. 28, 2021 (KR) .................. 10-2021-0127720

(51) Int. Cl.
*H05K 1/03* (2006.01)
*G06F 1/16* (2006.01)
(Continued)

(52) U.S. Cl.
CPC ......... *H05K 1/0393* (2013.01); *G06F 1/1652* (2013.01); *G06F 1/1681* (2013.01);
(Continued)

(58) Field of Classification Search
CPC ............... H05K 1/0393; H05K 3/0014; H05K 2201/056; H05K 3/4691; G06F 1/1652;
(Continued)

(56) References Cited

U.S. PATENT DOCUMENTS 10,838,458 B1 11/2020 Park et al.
11,243,578 B2 * 2/2022 Torres .................. G06F 1/1616
(Continued)

FOREIGN PATENT DOCUMENTS

EP 3 647 901 A1 5/2020
JP 2012-222621 A 11/2012
(Continued)

OTHER PUBLICATIONS

Extended European Search Report dated Sep. 13, 2024 for EP Application No. 22876695.2.
(Continued)

*Primary Examiner* — Anthony M Haughton
*Assistant Examiner* — Theron S Milliser
(74) *Attorney, Agent, or Firm* — Nixon & Vanderhye P.C.

(57) ABSTRACT

An electronic device may include, for example: a first housing, a second housing, a hinge cover, a hinge structure, a display, and a flexible printed circuit board (FPCB) including a rigid portion configured to be disposed on a first cover portion in the folded state, a first flexible portion connected to the rigid portion and configured to be at least partially bent along a second cover portion, and a second flexible portion connected to the rigid portion oppositely to the first flexible portion and configured to be at least partially bent along a third cover portion. The rigid portion is more rigid than the first flexible portion and the second flexible portion.

13 Claims, 16 Drawing Sheets

(51) Int. Cl.
    *G09F 9/30*               (2006.01)
    *G09G 3/00*               (2006.01)
    *G06F 3/041*             (2006.01)

(52) U.S. Cl.
    CPC .............. *G09F 9/301* (2013.01); *G09G 3/035* (2020.08); *G06F 3/041* (2013.01); *G09G 2380/02* (2013.01)

(58) Field of Classification Search
    CPC ...... G06F 1/1681; G06F 3/041; G06F 1/1641; G06F 1/1656; G06F 1/1683; G06F 1/1616; G09F 9/301; G09G 3/035; G09G 2380/02
    See application file for complete search history.

(56) References Cited

U.S. PATENT DOCUMENTS

| | | | | |
|---|---|---|---|---|
| 11,353,922 | B2* | 6/2022 | Lee | G06F 1/1652 |
| 11,758,672 | B2* | 9/2023 | Morino | G06F 1/1681 |
| | | | | 361/807 |
| 11,907,027 | B2* | 2/2024 | Torres | G06F 1/1616 |
| 12,096,580 | B2* | 9/2024 | Yang | H04M 1/0216 |
| 12,126,745 | B2* | 10/2024 | Luo | H04M 1/0277 |
| 12,279,375 | B2* | 4/2025 | Torres | H05K 1/189 |
| 12,287,669 | B2* | 4/2025 | Lee | G06F 1/1683 |
| 12,287,682 | B2* | 4/2025 | Miyamoto | H04M 1/0216 |
| 2019/0369668 | A1 | 12/2019 | Kim et al. | |
| 2020/0060020 | A1 | 2/2020 | Park et al. | |
| 2020/0267839 | A1 | 8/2020 | Woo et al. | |
| 2020/0272207 | A1 | 8/2020 | Silvanto et al. | |
| 2020/0351393 | A1 | 11/2020 | Kang et al. | |
| 2021/0034116 | A1* | 2/2021 | Torres | G06F 1/1681 |
| 2021/0247806 | A1* | 8/2021 | Lee | G06F 1/1641 |
| 2022/0035422 | A1* | 2/2022 | Torres | G09F 9/301 |
| 2022/0291720 | A1* | 9/2022 | Luo | G06F 1/181 |
| 2022/0321683 | A1* | 10/2022 | Luo | H04M 1/0268 |
| 2022/0338362 | A1* | 10/2022 | Morino | G06F 1/1641 |
| 2022/0386487 | A1* | 12/2022 | Lee | G06F 1/1652 |
| 2023/0305602 | A1* | 9/2023 | Miyamoto | G06F 1/1616 |
| 2024/0007551 | A1* | 1/2024 | Seo | H05K 1/16 |
| 2024/0211004 | A1* | 6/2024 | Kinoshita | G06F 1/1681 |
| 2024/0215191 | A1* | 6/2024 | Yang | H04R 1/1016 |
| 2024/0292542 | A1* | 8/2024 | Torres | H05K 1/189 |

FOREIGN PATENT DOCUMENTS

| | | |
|---|---|---|
| KR | 10-1012699 | 2/2011 |
| KR | 10-2019-0020495 A | 3/2019 |
| KR | 10-2019-0137433 A | 12/2019 |
| KR | 10-2020-0021172 A | 2/2020 |
| KR | 10-2020-0100490 | 8/2020 |
| KR | 10-2020-0101201 A | 8/2020 |
| KR | 10-2021-0014606 A | 2/2021 |

OTHER PUBLICATIONS

PCT International Search Report dated Dec. 9, 2022 for PCT Application No. PCT/KR2022/013152.

\* cited by examiner

FOLDABLE ELECTRONIC DEVICE INCLUDING FLEXIBLE PRINTED CIRCUIT BOARD

CROSS-REFERENCE TO RELATED APPLICATIONS

This application is a continuation of International Application No. PCT/KR2022/013152 designating the United States, filed on Sep. 2, 2022, in the Korean Intellectual Property Receiving Office and claiming priority to Korean Patent Application No. 10-2021-0127720 filed on Sep. 28, 2021, in the Korean Intellectual Property Office, the disclosures of which are incorporated by reference herein in their entireties.

BACKGROUND

1. Field

The disclosure relates to a foldable electronic device, for example, to a foldable electronic device including a flexible printed circuit board (FPCB) of which a shape changes between an unfolded state and a folded state according to an operation performed by a user.

2. Description of Related Art

As a foldable electronic device with a flexible display to be folded and unfolded by a hinge assembly, an electronic device with a reduced thickness and an efficient arrangement of mechanical and/or electronic components in a reduced space is in development.

SUMMARY

An example aspect of the present disclosure provides an electronic device that implements, or is configured to implement, a stable shape change of components in a reduced space of the electronic device.

However, technical aspects are not limited to the foregoing aspect, and other technical aspects may also be present. Additional aspects of the disclosure will be set forth in part in the description which follows and, in part, will be apparent from the description, or may be learned by practice of the presented embodiments of the disclosure.

According to an example embodiment, an electronic device may include: a first housing, a second housing, a hinge cover disposed between the first housing and the second housing, and including a first cover portion, a second cover portion at a first side of the first cover portion, and a third cover portion at a second side of the first cover portion opposite to the first side, a hinge structure disposed on (directly or indirectly) the hinge cover, and configured to rotate the first housing and the second housing, between a folded state in which the first housing and the second housing form a first angle and an unfolded state in which the first housing and the second housing form a second angle greater than the first angle, a display including a first area disposed on and/or for the first housing, a second area disposed on and/or for the second housing, and a flexible area between the first area and the second area, and a flexible printed circuit board (FPCB) including a rigid portion configured to be disposed on (directly or indirectly) the first cover portion in the folded state, a first flexible portion connected to (directly or indirectly) the rigid portion and configured to be at least partially bent along the second cover portion, and a second flexible portion connected to (directly or indirectly) the rigid portion oppositely to the first flexible portion and configured to be at least partially bent along the third cover portion, wherein the rigid portion is more rigid than the first flexible portion and the second flexible portion.

According to an example embodiment, an FPCB may include: a rigid portion, a first flexible portion connected to the rigid portion and configured to be at least partially bent, and a second flexible portion connected to the rigid portion oppositely to the first flexible portion and configured to be at least partially bent.

According to an example embodiment, an electronic device may include: a first housing, a second housing, a hinge cover disposed between the first housing and the second housing, and including a first cover portion, a second cover portion at a first side of the first cover portion, and a third cover portion at a second side of the first cover portion opposite to the first side, a hinge structure disposed on the hinge cover, and configured to rotate the first housing and the second housing, between a folded state in which the first housing and the second housing form a first angle and an unfolded state in which the first housing and the second housing form a second angle greater than the first angle, a display including a first area disposed on the first housing, a second area disposed on the second housing, and a flexible area between the first area and the second area, a first bracket disposed between the first area and the first housing, a second bracket disposed between the second area and the second housing, and an FPCB including a rigid portion configured to be disposed on the first cover portion in the folded state, a first flexible portion disposed between the first bracket and the second cover portion, connected to the rigid portion, and configured to be at least partially bent along the second cover portion, and a second flexible portion disposed between the second bracket and the third cover portion, connected to the rigid portion oppositely to the first flexible portion, and configured to be at least partially bent along the third cover portion.

According to an example embodiment described herein, a stable shape change of components may be implemented in an electronic device with a reduced thickness and a reduced internal space. The aspects of the electronic device according to an embodiment are not limited to the above descriptions, and other aspects will be apparent to those skilled in the art from the following descriptions.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
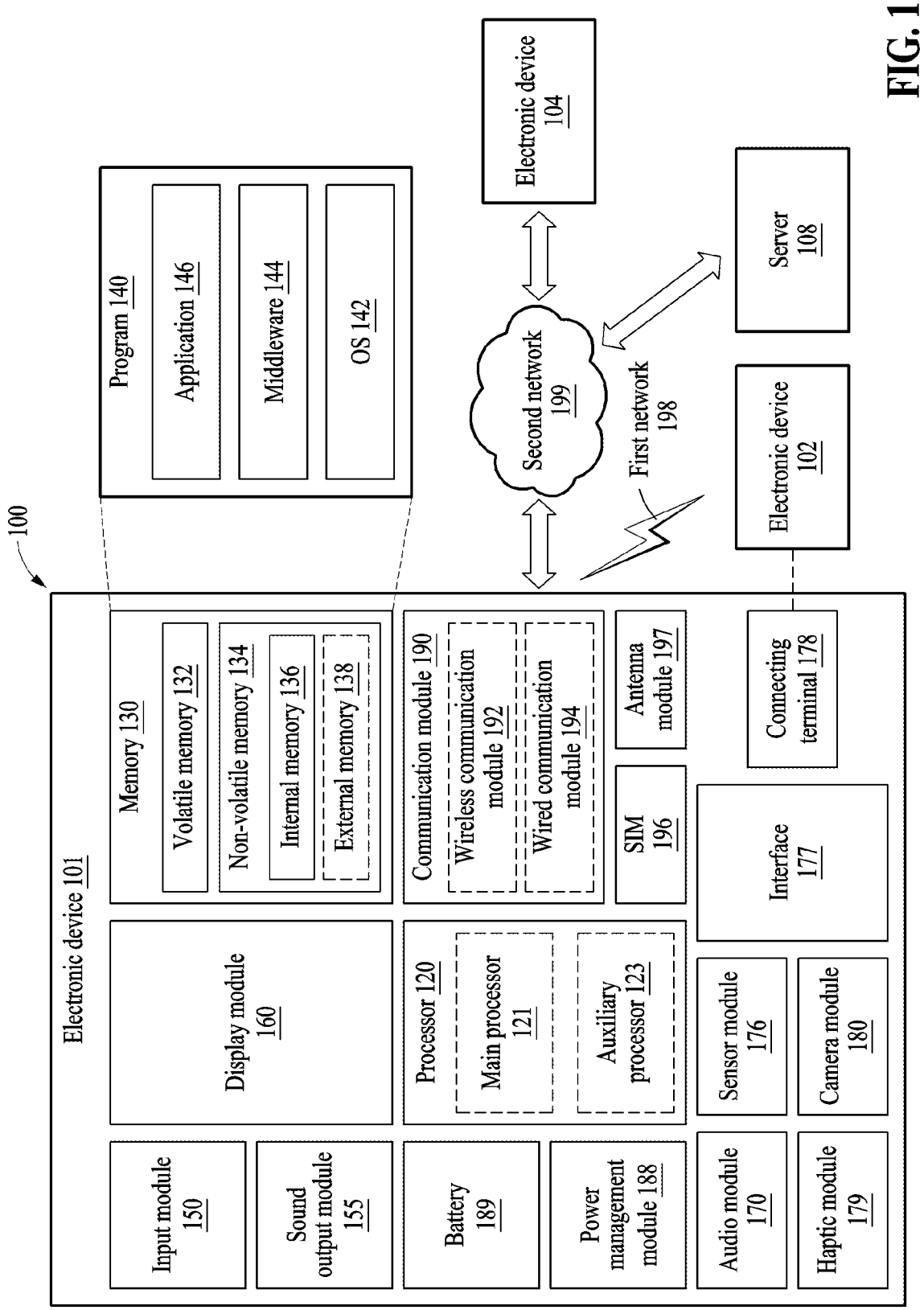
FIG. 1 is a block diagram illustrating an example electronic device in a network environment according to an example embodiment.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the above components may be omitted from the electronic device 101, or one or more other components may be added in the electronic device 101. In an embodiment, some (e.g., the sensor module 176, the camera module 180, or the antenna module 197) of the components may be integrated as a single component (e.g., the display module 160). Each "module" herein may comprise circuitry.

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Each "processor" herein comprises processing circuitry.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be appreciated that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via at least a third element.

As used in connection with an embodiment of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

An embodiment set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment may be included and provided in a computer program product. The computer program product may be traded as a product between a seller and a buyer (or purchaser described herein). The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium such as memory of the manufacturer's server, a server of the application store, or a relay server. According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Each embodiment herein may be used in combination with any other embodiment(s) herein.

Figure 2A:
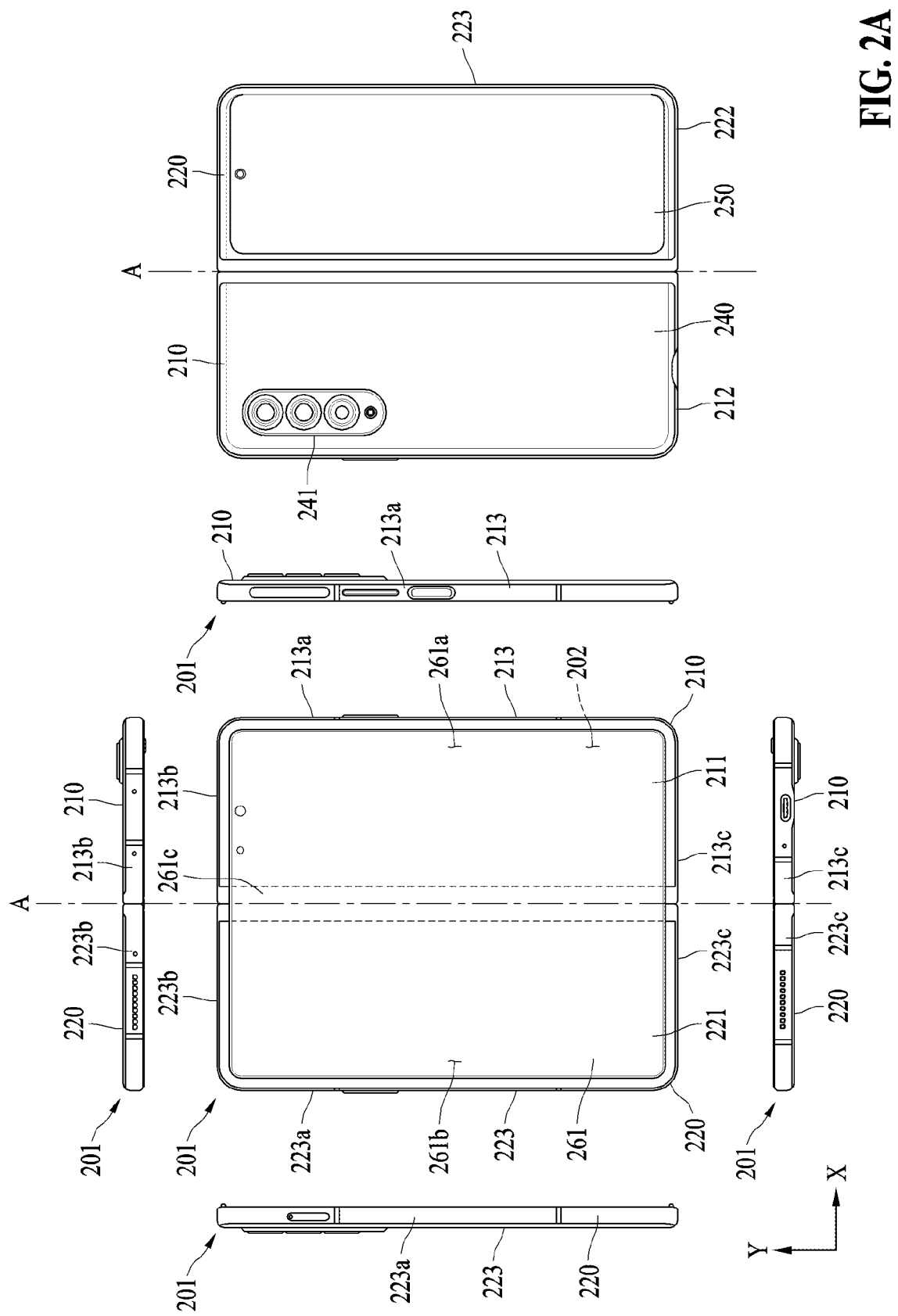
FIG. 2A is a view illustrating an example electronic device in an unfolded state according to an example embodiment.
Figure 2B:
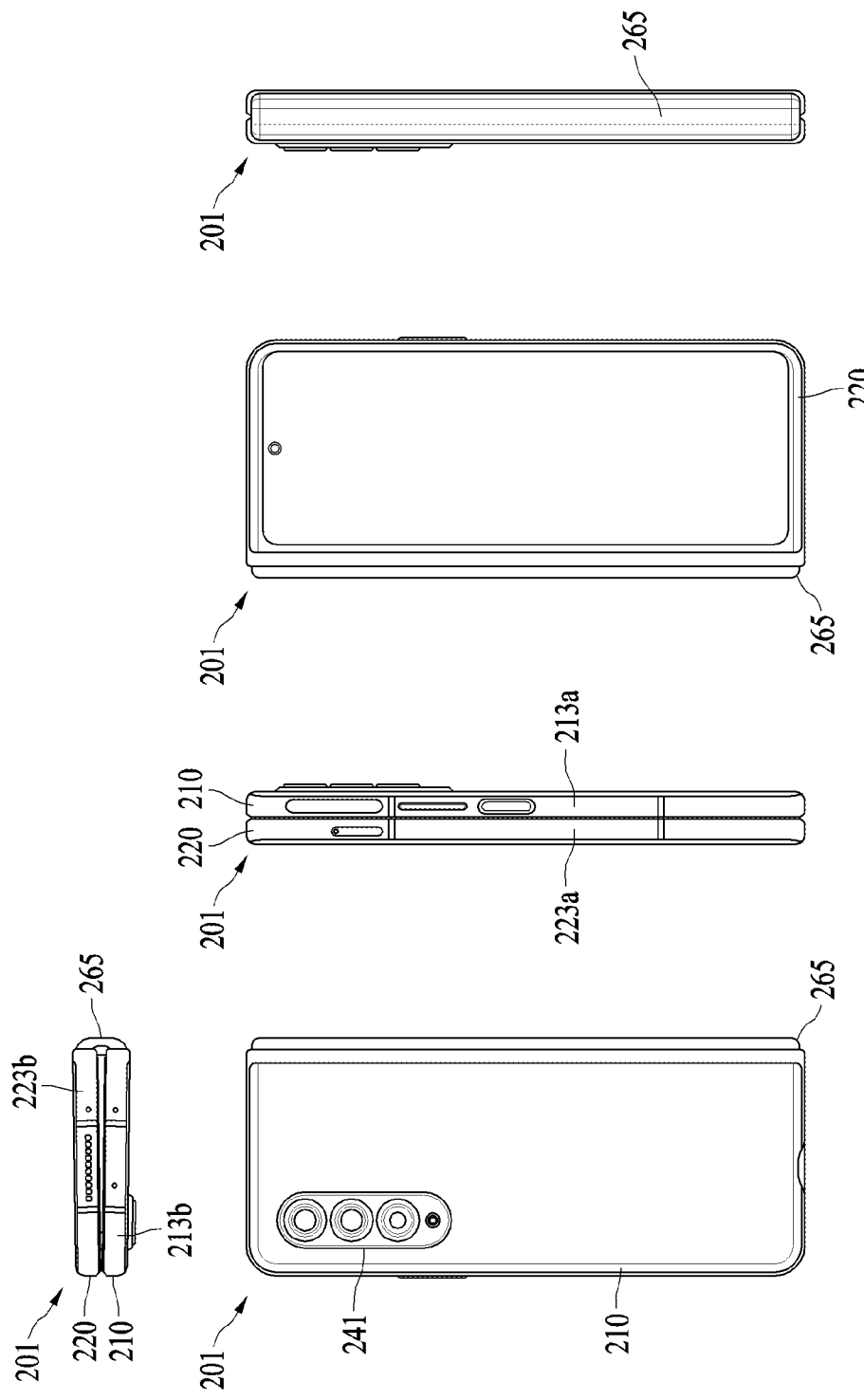
FIG. 2B is a view illustrating an example electronic device in a folded state according to an example embodiment.

Referring to FIGS. 2A and 2B, a foldable electronic device 201 may include a pair of housings 210 and 220 rotatably coupled to each other through a hinge structure (e.g., a hinge structure 334 of FIG. 3) to be folded with respect to each other, a hinge cover 265 covering foldable portions of the housings 210 and 220, and a display 261 (e.g., a flexible display or a foldable display) disposed in a space formed by the housings 210 and 220. Herein, a surface on which the display 261 is disposed may be defined as a front surface of the foldable electronic device 201, and a surface opposite to the front surface may be defined as a rear surface of the foldable electronic device 201. In addition, a surface surrounding a space between the front surface and the rear surface may be defined as a side surface of the foldable electronic device 201.

In an embodiment, the pair of housings 210 and 220 may include a first housing 210, a second housing 220, a first rear cover 240, and a second rear cover 250. The pair of housings 210 and 220 of the electronic device 201 are not limited to the shapes or the combination and/or coupling of components shown in FIGS. 2A and 2B, but may be implemented in other shapes or by another combination and/or coupling of components.

In an embodiment, the first housing 210 and the second housing 220 may be disposed on both sides with respect to a folding axis A, and may be disposed substantially symmetrically with respect to the folding axis A. In an embodiment, an angle or distance between the first housing 210 and the second housing 220 may vary depending on whether the electronic device 201 is in an unfolded state, a folded state, or an intermediate state. In an embodiment, the first housing 210 and the second housing 220 may be substantially symmetrically disposed.

In an embodiment, the first housing 210 may be connected to a hinge structure (e.g., a hinge structure 334 of FIG. 3) in the unfolded state of the electronic device 201. The first housing 210 may include a first surface 211 facing the front surface of the electronic device 201, a second surface 212 facing an opposite side of the first surface 211, and a first side portion/member 213 enclosing at least a portion of a space between the first surface 211 and the second surface 212. The first side member 213 may include a first side surface 213a disposed substantially in parallel to the folding axis A, a second side surface 213b extending in a direction substantially perpendicular to the folding axis A from one end of the first side surface 213a, and a third side surface 213c extending in a direction substantially perpendicular to the folding axis A from another end of the first side surface 213a and substantially parallel to the second side surface 213b. The second housing 220 may be connected to the hinge structure (e.g., a hinge structure 334 of FIG. 3) in the unfolded state of the electronic device 201. The second housing 220 may include a third surface 221 facing the front surface of the electronic device 201, a fourth surface 222 facing an opposite side of the third surface 221, and a second side portion/member 223 enclosing at least a portion of a space between the third surface 221 and the fourth surface 222. The second side portion/member 223 may include a fourth side surface 223a disposed substantially in parallel to the folding axis A, a fifth side surface 223b extending in a direction substantially perpendicular to the folding axis A from one end of the fourth side surface 223a, and a sixth side surface 223c extending in a direction substantially perpendicular to the folding axis A from another end of the fourth side surface 223a and substantially parallel to the fifth side surface 223b. The first surface 211 and the third surface 221 may face each other when the electronic device 201 is in the folded state.

In an embodiment, the electronic device 201 may include at least one sound output module including sound output circuitry (e.g., the sound output module 155 of FIG. 1) disposed on the fifth side surface 223b and/or the sixth side surface 223c of the second housing 220.

In an embodiment, the electronic device 201 may include a recessed accommodating portion 202 for accommodating the display 261 through the structural coupling of the first housing 210 and the second housing 220. The accommodating portion 202 may have substantially the same size as the display 261.

In an embodiment, at least a portion of the first housing 210 and the second housing 220 may be formed of a metal or non-metal material having a predetermined magnitude of rigidity appropriate to support the display 261.

In an embodiment, the electronic device 201 may include at least one component for performing various functions, which is disposed to be exposed on the front surface of the electronic device 201. The component may include, for example, at least one of a front camera module including a camera, a receiver, a proximity sensor, an illuminance sensor, an iris recognition sensor, an ultrasonic sensor, or an indicator.

In an embodiment, the first rear cover 240 may be disposed on (directly or indirectly) the second surface 212 of the first housing 210, and have a substantially rectangular periphery. At least a portion of the periphery of the first rear cover 240 may be surrounded by the first housing 210. The second rear cover 250 may be disposed on (directly or indirectly) the fourth surface 222 of the second housing 220, and have a substantially rectangular periphery. At least a portion of the periphery of the second rear cover 250 may be surrounded by the second housing 220.

In an embodiment, the first rear cover 240 and the second rear cover 250 may have substantially symmetrical shapes with respect to the folding axis A. In an embodiment, the first rear cover 240 and the second rear cover 250 may have different shapes. In still an embodiment, the first housing 210 and the first rear cover 240 may be integrally formed, and the second housing 220 and the second rear cover 250 may be integrally formed.

In an embodiment, the first housing 210, the second housing 220, the first rear cover 240, and the second rear cover 250 may provide a space in which various components (e.g., a PCB, the antenna module (including at least one antenna) 197 of FIG. 1, the sensor module 176 (including at least one sensor) of FIG. 1, or the battery 189 of FIG. 1) of the electronic device 201 are arranged, through a structure in which the first housing 210, the second housing 220, the first rear cover 240, and the second rear cover 250 are coupled to one another. In an embodiment, at least one component may be visually exposed on the rear surface of the electronic device 201. For example, at least one component may be visually exposed through a first rear area 241 of the first rear cover 240. The component may include a proximity sensor, a rear camera module including a camera, and/or a flash, for example.

In an embodiment, the display 261 may be disposed in the accommodating portion 202 formed by the pair of housings 210 and 220. For example, the display 261 may be arranged to occupy substantially most of the front surface of the electronic device 201. The front surface of the electronic device 201 may include an area in which the display 261 is disposed, and a partial area (e.g., a periphery area) of the first housing 210 and a partial area (e.g., a periphery area) of the second housing 220 that are adjacent to the display 261. The rear surface of the electronic device 201 may include the first rear cover 240, a partial area (e.g., a periphery area) of the first housing 210 adjacent to the first rear cover 240, the second rear cover 250, and a partial area (e.g., a periphery area) of the second housing 220 adjacent to the second rear cover 250. In an embodiment, the display 261 may be a display in which at least one area is deformable into a planar surface or a curved surface. In an embodiment, the display 261 may include a flexible area 261c, a first area 261a on a first side (e.g., the right side) of the flexible area 261c, and a second area 261b on a second side (e.g., the left side) of the flexible area 261c. For example, the first area 261a may be disposed in the first surface 211 of the first housing 210, and the second area 261b may be disposed in the third surface 221 of the second housing 220. However, such an area division of the display 261 is provided merely as an example, and the display 261 may be divided into a plurality of areas based on a structure or functions of the display 261. For example, as illustrated in FIG. 2A, the display 261 may be divided into areas based on the folding axis A or the flexible area 261c extending in parallel to a Y-axis, or the display 261 may be divided into areas based on another flexible area (e.g., a flexible area extending in parallel to an X-axis) or another folding axis (e.g., a folding axis parallel to the X-axis). Such an area division of the display 261 is merely a physical division based on the pair of housings 210 and 220 and the hinge structure (e.g., a hinge structure 334 of FIG. 3), and the display 261 may display substantially a single screen through the pair of housings 210 and 220 and the hinge structure. In an embodiment, the first area 261a and the second area 261b may have substantially symmetrical shapes with respect to the flexible area 261c.

Figure 3:
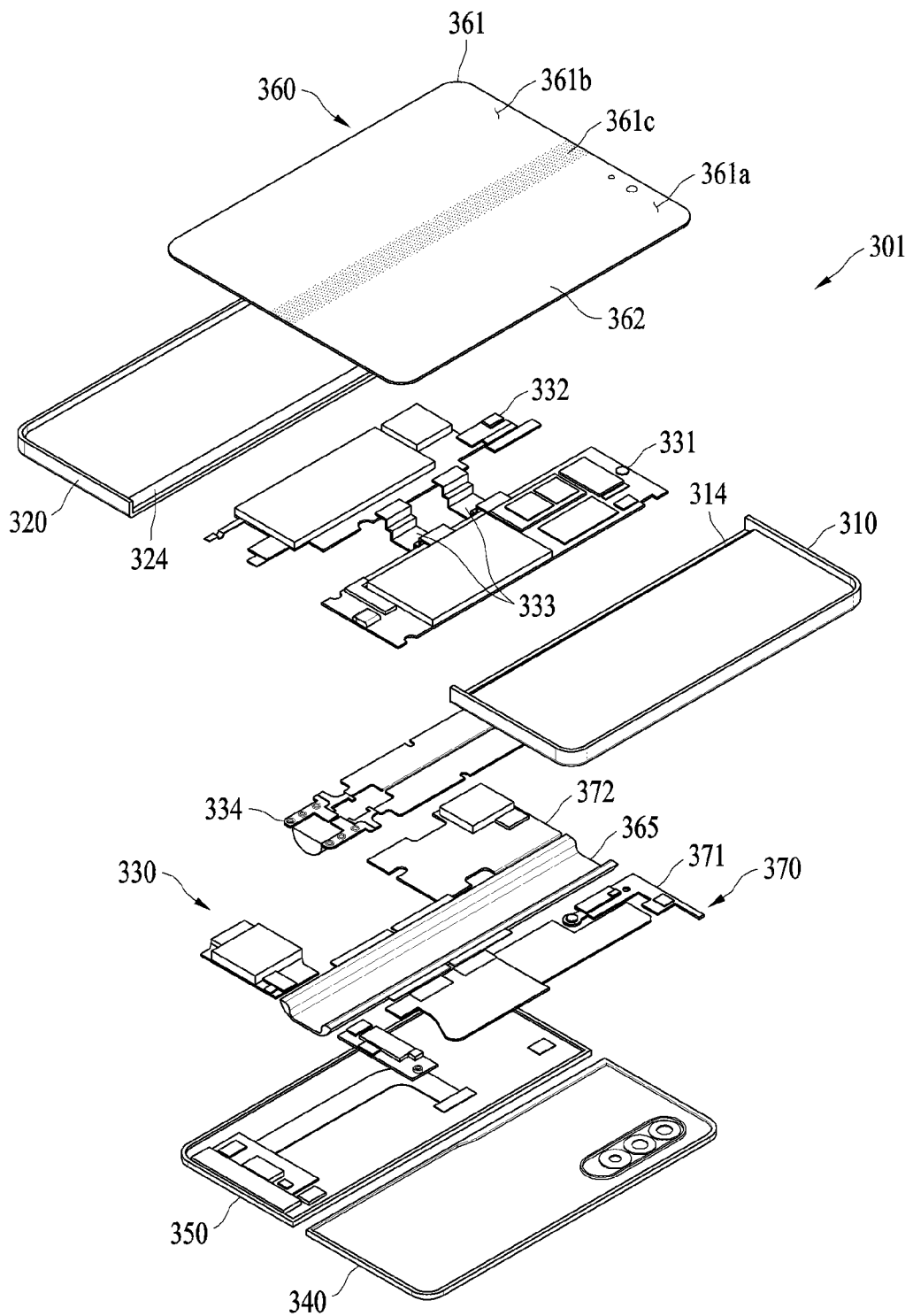
FIG. 3 is an exploded perspective view of an example electronic device according to an example embodiment.

In an embodiment, the hinge cover 265 may be disposed between the first housing 210 and the second housing 220 and configured to cover the hinge structure (e.g., a hinge structure 334 of FIG. 3). The hinge cover 265 may be hidden by at least a portion of the first housing 210 and the second housing 220 or exposed to the outside according to an operating state of the electronic device 201. For example, the hinge cover 265 may be hidden by the first housing 210 and the second housing 220 not being exposed to the outside when the electronic device 201 is in the unfolded state as illustrated in FIG. 2A, and the hinge cover 265 may be exposed to the outside between the first housing 210 and the second housing 220 when the electronic device 201 is in the folded state as illustrated in FIG. 2B. In addition, when the electronic device 201 is in the intermediate state in which the first housing 210 and the second housing 220 form an angle with each other, at least a portion of the hinge cover 265 may be exposed to the outside between the first housing 210 and the second housing 220. In this case, An area of the hinge cover 265 exposed to the outside may be smaller than an area of the hinge cover 265 exposed when the electronic device 201 is in the folded state. In an embodiment, the hinge cover 265 may have a curved surface.

As for operations of the electronic device 201, when the electronic device 201 is in the unfolded state (e.g., a state of the electronic device 201 illustrated in FIG. 2A), the first housing 210 and the second housing 220 may form a first angle (e.g., approximately 180 degrees (°)) with each other, and the first area 261a and the second area 261b of the display 261 may be oriented in substantially the same direction. The flexible area 261c of the display 261 may be on substantially the same plane as the first area 261a and the second area 261b. In an embodiment, when the electronic device 201 is in the unfolded state, the first housing 210 may rotate at a second angle (e.g., approximately 360°) relative to the second housing 220, whereby the first housing 210 and the second housing 220 may be reversely folded such that the second surface 212 and the fourth surface 222 face each other. When the electronic device 201 is in the folded state (e.g., a state of the electronic device 201 illustrated in FIG. 2B), the first housing 210 and the second housing 220 may face each other. The first housing 210 and the second housing 220 may form an angle of approximately 0° to 10°, and the first area 261a and the second area 261b of the display 261 may face each other. At least a portion of the folding/flexible area 261c of the display 261 may be deformed into a curved surface. In addition, when the electronic device 201 is in the intermediate state, the first housing 210 and the second housing 220 may form a predetermined angle with each other. In this case, an angle (e.g., a third angle, approximately 90°) formed by the first area 261a and the second area 261b of the display 261 may be greater than that when the electronic device 201 is in the folded state and less than that when the electronic device 201 is in the unfolded state. At least a portion of the flexible area 261c of the display 261 may be deformed into a curved surface. In this case, a curvature of the curved surface of the flexible area 261c may be smaller than that when the electronic device 201 is in the folded state.

An embodiment of an electronic device described herein are not limited to a form factor of the electronic device 201 described above with reference to FIGS. 2A and 2B, but may also be applicable to electronic devices with various form factors.

Referring to FIG. 3, according to an embodiment, an electronic device 301 may include a display module 360 (e.g., the display module 160, including a display, of FIG. 1), a hinge assembly 330, a substrate 370, and a first housing 310 (e.g., the first housing 210 of FIGS. 2A and 2B), a second housing 320 (e.g., the second housing 220 of FIGS. 2A and 2B), a first rear cover 340 (e.g., the first rear cover 240 of FIGS. 2A and 2B), and a second rear cover 350 (e.g., the second rear cover 250 of FIGS. 2A and 2B).

The display module 360 may include a display 361 (e.g., the display 261 of FIGS. 2A and 2B) and at least one layer or plate 362 on which the display 361 is seated. In an embodiment, the plate 362 may be disposed between the display 361 and the hinge assembly 330. The display 361 may be disposed on (directly or indirectly) at least a portion of one surface (e.g., a top surface) of the plate 362. The plate 362 may be formed in a shape corresponding to the display 361.

The hinge assembly 330 may include a first bracket 331, a second bracket 332, a hinge structure 334 disposed between the first bracket 331 and the second bracket 332, a hinge cover 365 covering the hinge structure 334 when viewed from the outside, and a printed circuit board (PCB) 333 (e.g., a flexible PCB (FPCB)) that traverses the first bracket 331 and the second bracket 332. The PCB 333 may be formed as an FPCB, for example.

In an embodiment, the hinge assembly 330 may be disposed between the plate 362 and the substrate 370. For example, the first bracket 331 may be disposed between a first area 361a of the display 361 and a first substrate 371. The second bracket 332 may be disposed between a second area 361b of the display 361 and a second substrate 372.

In an embodiment, at least a portion of the PCB 333 and the hinge structure 334 may be disposed inside the hinge assembly 330. The PCB 333 may be disposed in a direction (e.g., an X-axial direction) that traverses the first bracket 331 and the second bracket 332. The PCB 333 may be disposed in a direction (e.g., the X-axial direction) perpendicular to a folding axis (e.g., a Y-axis or the folding axis A of FIG. 2A) of a flexible area 361c of the electronic device 301.

The substrate 370 may include the first substrate 371 disposed on (directly or indirectly) the first bracket 331 and the second substrate 372 disposed on the second bracket 332. The first substrate 371 and the second substrate 372 may be disposed in a space formed by the hinge assembly 330, the first housing 310, the second housing 320, the first rear cover 340, and the second rear cover 350. On the first substrate 371 and the second substrate 372, components for implementing various functions of the electronic device 301 may be provided.

The first housing 310 and the second housing 320 may be assembled together to be coupled to both sides of the hinge assembly 330 in a state in which the display module 360 is coupled to the hinge assembly 330. The first housing 310 and the second housing 320 may slide from both sides of the hinge assembly 330 to be coupled to the hinge assembly 330.

In an embodiment, the first housing 310 may include a first rotation support surface 314, and the second housing 320 may include a second rotation support surface 324 corresponding to the first rotation support surface 314. The first rotation support surface 314 and the second rotation support surface 324 may include curved surfaces corresponding to the curved surfaces included in the hinge cover 365.

In an embodiment, when the electronic device 301 is in an unfolded state (e.g., a state of the electronic device 201 illustrated in FIG. 2A), the first rotation support surface 314 and the second rotation support surface 324 may cover the hinge cover 365 such that the hinge cover 365 is not exposed through the rear surface of the electronic device 301 or is minimally or substantially minimally exposed. When the electronic device 301 is in a folded state (e.g., a state of the electronic device 201 illustrated in FIG. 2B), the first rotation support surface 314 and the second rotation support surface 324 may rotate along the curved surfaces included in the hinge cover 365 such that the hinge cover 365 is maximally or largely exposed through the rear surface of the electronic device 301.

Figure 4A:
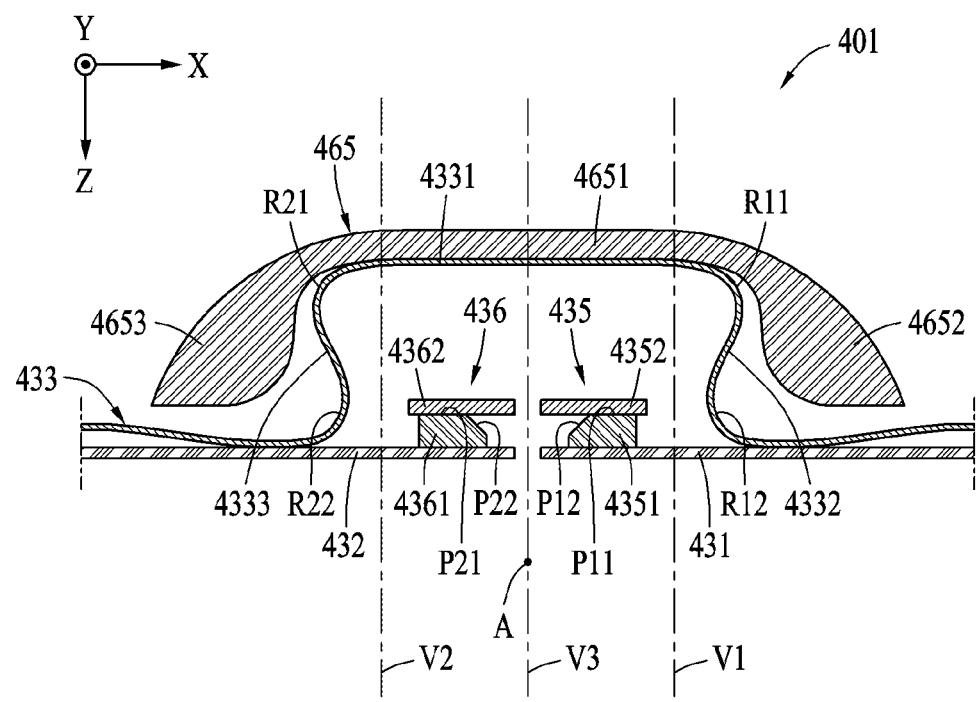
FIG. 4A is a cross-sectional view of an electronic device in an unfolded state according to an example embodiment.
Figure 4B:
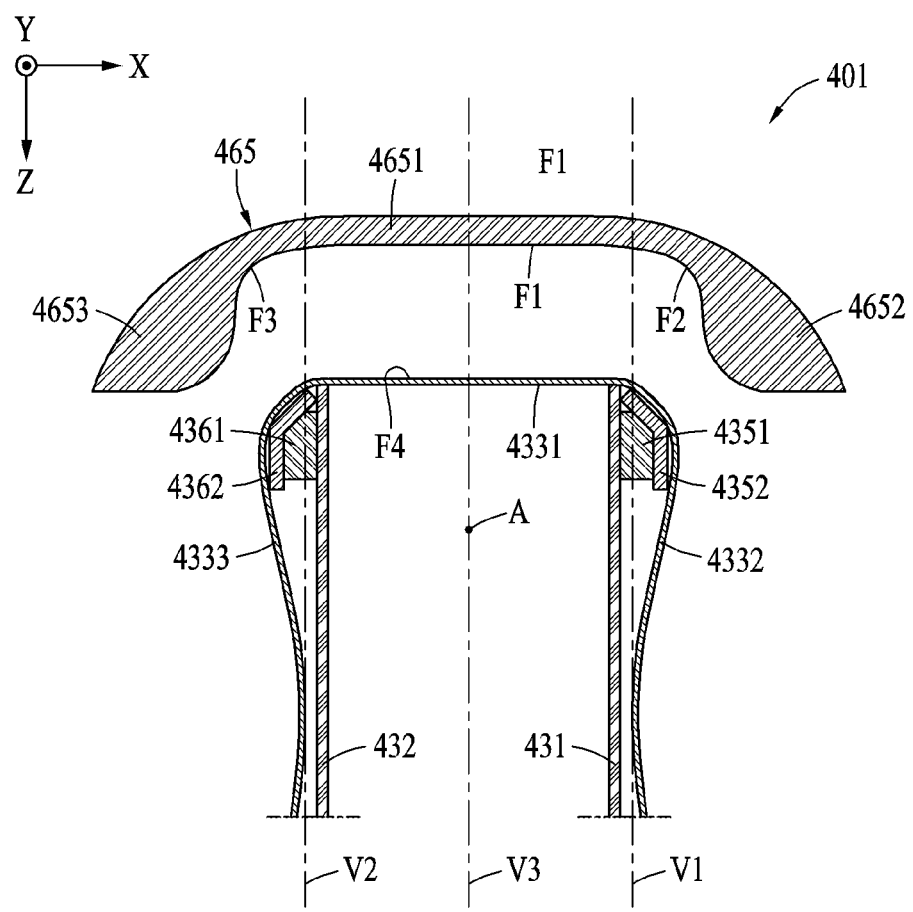
FIG. 4B is a cross-sectional view of an electronic device in an unfolded state according to an example embodiment.
Figure 4C:
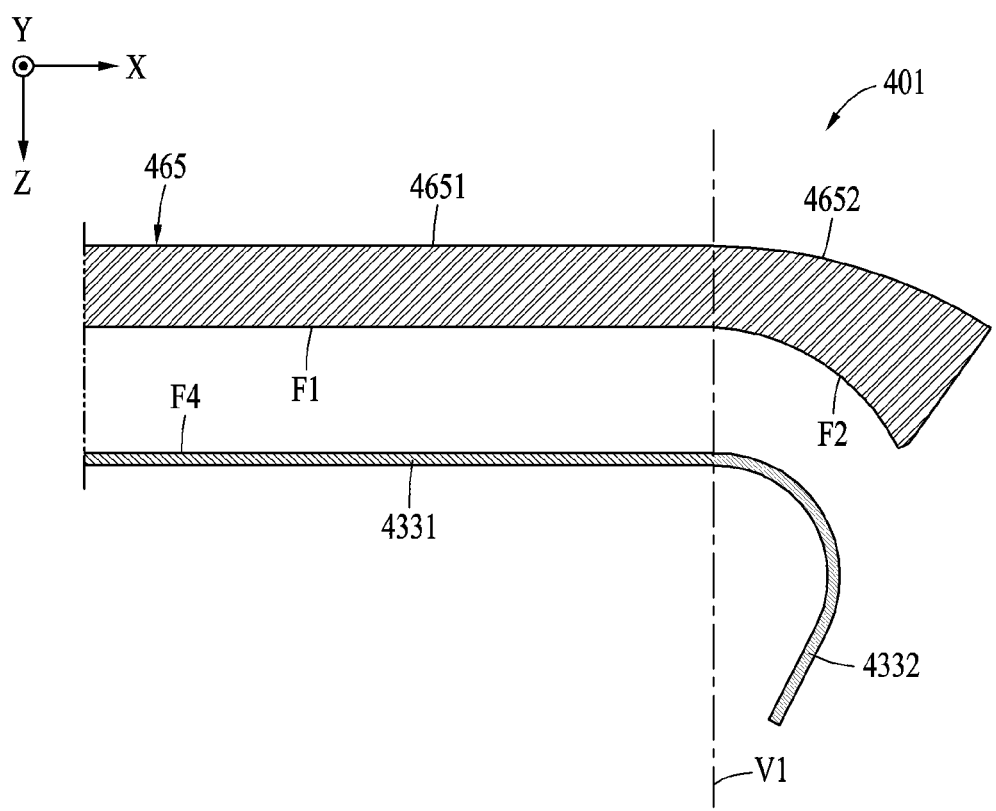
FIG. 4C is a view illustrating an example of a portion of a hinge cover and a portion of a flexible printed circuit board (FPCB) according to an example embodiment.

Referring to FIGS. 4A, 4B, and 4C, according to an embodiment, an electronic device 401 (e.g., the electronic device 301 of FIG. 3) may include a first housing (e.g., the first housing 310), a second housing (e.g., the second housing 320), a first bracket 431 (e.g., the first bracket 331), a second bracket 432 (e.g., the second bracket 332), an FPCB 433 (e.g., the PCB 333), a first support body 435, a second support body 436, and a hinge cover 465 (e.g., the hinge cover 365).

The first support body 435 may support the first bracket 431. The first support body 435 may include a first fixing body 4351 fixed to one surface (e.g., a top surface in FIG. 4A) of the first bracket 431 and a first elastic body 4352 disposed on one surface (e.g., P11 and P12) of the first fixing body 4351.

The first fixing body 4351 may include a first support plane P11 that is substantially flat and at least partially supports the first elastic body 4352 and a second support plane P12 that is inclined to the first support plane P11. For example, when a state of the electronic device 401 changes from an unfolded state (e.g., as illustrated in FIG. 4A) to a folded state (e.g., as illustrated in FIG. 4B), a portion of the first elastic body 4352 that is not supported by the first support plane P11 may contact at least a portion of the FPCB 433 (e.g., a rigid portion 4331 and/or a first flexible portion 4332 of the FPCB 433) and may be at least partially bent to be supported by the second support plane P12.

The second support body 436 may support the second bracket 432. The second support body 436 may include a second fixing body 4361 fixed to one surface (e.g., a top surface in FIG. 4A) of the second bracket 432 and a second elastic body 4362 disposed on one surface (e.g., P21 and P22) of the second fixing body 4361.

The second fixing body 4361 may include a third support plane P21 that is substantially flat and at least partially supports the second elastic body 4362 and a fourth support plane P22 that is inclined to the third support plane P21. For example, when the state of the electronic device 401 changes from the unfolded state (e.g., as illustrated in FIG. 4A) to the folded state (e.g., as illustrated in FIG. 4B), a portion of the second elastic body 4362 that is not supported by the third support plane P21 may contact at least a portion of the FPCB 433 (e.g., the rigid portion 4331 and/or a second flexible portion 4333 of the FPCB 433) and may be at least partially bent to be supported by the fourth support plane P22.

The hinge cover 465 may include a first cover portion 4651 (e.g., a bottom portion) having a first inner face F1, a second cover portion 4652 (e.g., a first wall portion) having a second inner face F2 at a first side (e.g., a right side in FIG. 4A) of the first cover portion 4651, and a third cover portion 4653 (e.g., a second wall portion) having a third inner face F3 at a second side (e.g., a left side in FIG. 4A) opposite to the first side of the first cover portion 4651.

In an embodiment, the first cover portion 4651 may be symmetrical with respect to a virtual reference plane V3 including a folding axis A. For example, the reference plane V3 may cross (e.g., be orthogonal to) the first inner face F1 of the first cover portion 4651. The second cover portion 4652 and the third cover portion 4653 may be symmetrical to each other with respect to the virtual reference plane V3 including the folding axis A. The first inner face F1 may be a substantially flat surface, and the second inner face F2 and the third inner face F3 may be substantially curved surfaces. The first inner face F1, the second inner face F2, and the third inner face F3 may be substantially seamlessly connected to form a single surface.

The FPCB 433 may include the rigid portion 4331, the first flexible portion 4332 connected to a first side (e.g., the right side in FIG. 4A) of the rigid portion 4331, and the second flexible portion 4333 connected to a second side (e.g., the left side in FIG. 4A) of the rigid portion 4331.

The rigid portion 4331 may be a portion that is relatively substantially rigid in the FPCB 433, and the first flexible portion 4332 and the second flexible portion 4333 may be a portion that is relatively substantially flexible in the FPCB 433. For example, the rigid portion 4331 is more rigid than the first flexible portion 4332 and the second flexible portion 4333. The rigidity of the FPCB 433 may change based on a point at which the rigid portion 4331 and the first flexible portion 4332 are connected, and the rigidity of the FPCB 433 may change based on a point at which the rigid portion 4331 and the second flexible portion 4333 are connected.

A first virtual plane V1 including the point at which the rigid portion 4331 and the first flexible portion 4332 are connected may be defined between the rigid portion 4331 and the first flexible portion 4332. A second virtual plane V2 including the point at which the rigid portion 4331 and the second flexible portion 4333 are connected may be defined between the rigid portion 4331 and the second flexible portion 4333. The reference plane V3 including the folding axis A may be defined between the first virtual plane V1 and the second virtual plane V2. In an embodiment, the first virtual plane V1 and the second virtual plane V2 may be substantially parallel to each other, and the first virtual plane V1, the second virtual plane V2, and the reference plane V3 may be substantially parallel to one another.

Although the FPCB 433 has been described above as being divided into the rigid portion 4331, the first flexible portion 4332, and the second flexible portion 4333, the rigid portion 4331, the first flexible portion 4332, and the second flexible portion 4333 may be construed as being a single component that is integrally formed.

The rigid portion 4331 may be configured to be disposed on (directly or indirectly) the first cover portion 4651 in the folded state (e.g., a state in which the first housing 310 and the second housing 320 of FIG. 3 form a first angle (e.g., approximately 0 to 10 degrees [°])) of the electronic device 401. The rigid portion 4331 may have a face F4 that substantially faces the first inner face F1 of the first cover portion 4651.

When the state of the electronic device 401 changes from the folded state to the unfolded state (e.g., a state in which the first housing 310 and the second housing 320 of FIG. 3 form a second angle (e.g., approximately 180°)), the rigid portion 4331 may move in a direction (e.g., a +Z direction in FIGS. 4A and 4B) receding from the first cover portion 4651. In contrast, when the state of the electronic device 401 changes from the unfolded state to the folded state, the rigid portion 4331 may move in another direction (e.g., a −Z direction in FIGS. 4A and 4B) approaching the first cover portion 4651.

The first flexible portion 4332 may be configured to be bent along the second inner face F2 of the second cover portion 4652, between the folded state and the unfolded state of the electronic device 401. In the folded state of the electronic device 401, the first flexible portion 4332 may have at least two rounded portions (e.g., R11 and R12). For example, a first rounded portion R11 may be formed to face an inner space of the hinge cover 465 along the second inner face F2, and a second rounded portion R12 may be formed to face the second cover portion 4652 along one surface (e.g., the top surface in FIG. 4A) of the first bracket 431. In the folded state of the electronic device 401, an opening stress of a predetermined value (e.g., approximately 48.4 megapascals (MPa)) may be applied to the first rounded portion R11 and the second rounded portion R12. In the unfolded state of the electronic device 401, the first flexible portion 4332 may at least partially contact the first elastic body 4352 and be bent while extending along one surface of the first bracket 431.

The second flexible portion 4333 may be configured to be bent along the third inner face F3 of the third cover portion 4653, between the folded state and the unfolded state of the electronic device 401. In the folded state of the electronic device 401, the second flexible portion 4333 may have at least two rounded portions (e.g., R21 and R22). For example, a third rounded portion R21 may be formed to face the inner space of the hinge cover 465 along the third inner face F3, and a fourth rounded portion R22 may be formed to face the third cover portion 4653 along one surface (e.g., the top surface in FIG. 4A) of the second bracket 432. In the folded state of the electronic device 401, an opening stress of a predetermined value (e.g., approximately 48.4 MPa) may be applied to the third rounded portion R21 and the fourth rounded portion R22. In the unfolded state of the electronic device 401, the second flexible portion 4333 may at least partially contact the second elastic body 4362 and be bent while extending along one surface of the second bracket 432.

While the electronic device 401 is changing in its state between the folded state and the unfolded state, the rigid portion 4331 may substantially maintain its form and/or shape. For example, the rigid portion 4331 may maintain a substantially symmetrical shape with respect to the reference plane V3, between the folded state and the unfolded state of the electronic device 401.

In an embodiment, while the electronic device 401 is changing in its state between the folded state and the unfolded state, the rigid portion 4331 may move along a preset trajectory. For example, the face F4 of the rigid portion 4331 may be oriented in a substantially constant direction (e.g., a +/−Z direction), between the folded state and the unfolded state of the electronic device 401. The rigid portion 4331 may move in a space between the first virtual plane V1 and the second virtual plane V2. The rigid portion 4331 may move along the reference plane V3. A normal direction of the face F4 of the rigid portion 4331 may be substantially orthogonal to a normal direction of the first virtual plane V1, a normal direction of the second virtual plane V2, and/or a normal direction of the third virtual plane V3.

In an embodiment, the face F4 of the rigid portion 4331 may have a shape that is substantially complementary to a shape of the first inner face F1. For example, when the first inner face F1 has a substantially flat surface, the face F4 of the rigid portion 4331 may also have a substantially flat surface. In an embodiment, the face F4 of the rigid portion 4331 may have a shape that is at least partially substantially complementary to the shape of the first inner face F1.

Figure 5A:
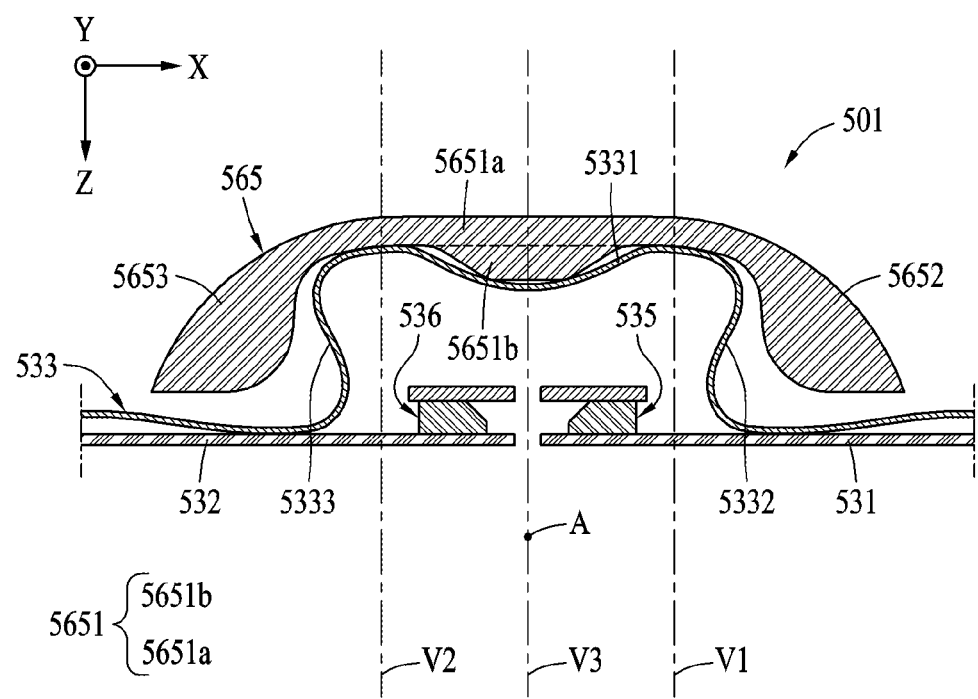
FIG. 5A is a cross-sectional view of an example electronic device in an unfolded state according to an example embodiment.
Figure 5B:
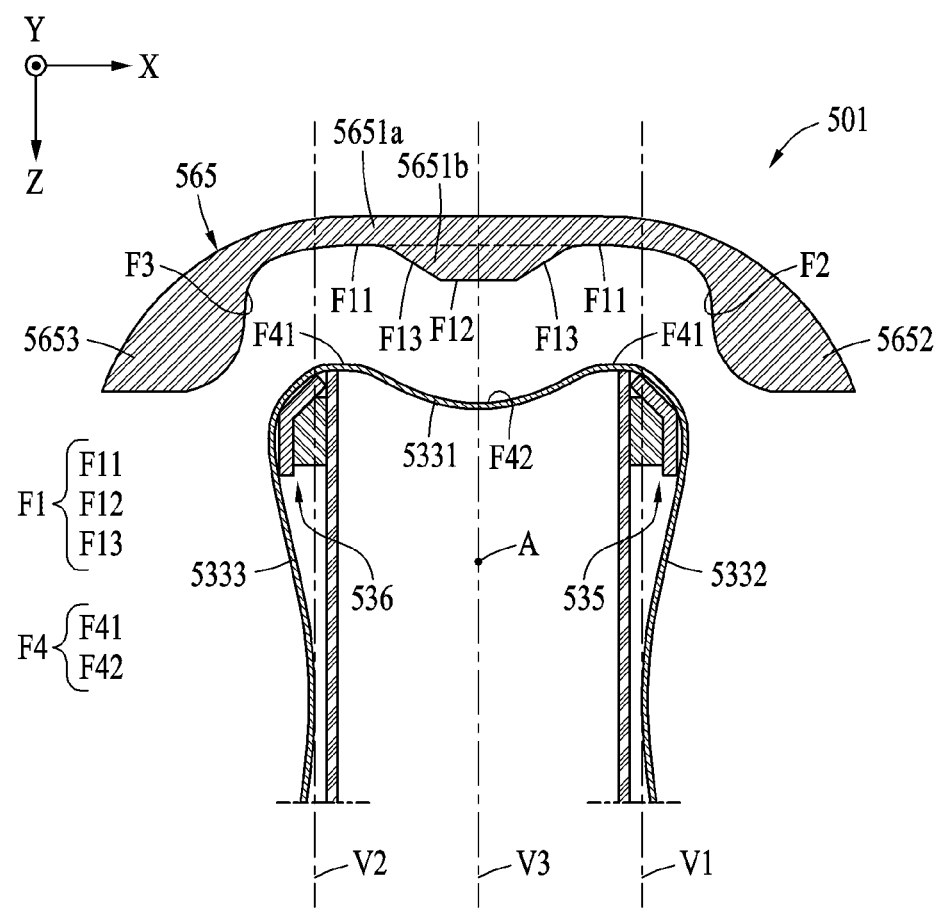
FIG. 5B is a cross-sectional view of an example electronic device in a folded state according to an example embodiment.
Figure 5C:
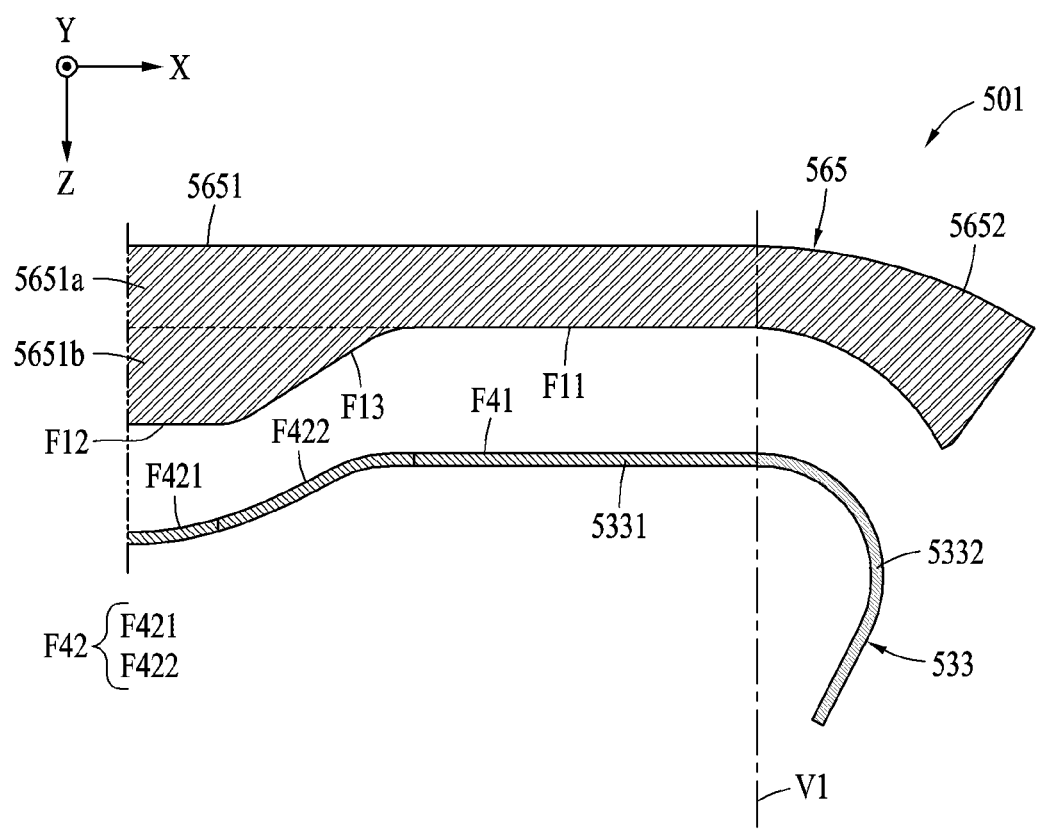
FIG. 5C is a view illustrating an example of a portion of a hinge cover and a portion of an FPCB according to an example embodiment.

Referring to FIGS. 5A, 5B, and 5C, according to an embodiment, an electronic device 501 (e.g., the electronic device 301 of FIG. 3) may include a first housing (e.g., the first housing 310), a second housing (e.g., the second housing 320), a first bracket 531 (e.g., the first bracket 331), a second bracket 532 (e.g., the second bracket 332), an FPCB 533 (e.g., the PCB 333), a first support body 535 (e.g., the first support body 435 of FIGS. 4A and 4B), a second support body 536 (e.g., the second support body 436 of FIGS. 4A and 4B), and a hinge cover 565 (e.g., the hinge cover 365 of FIG. 3 or the hinge cover 465 of FIGS. 4A through 4C).

The hinge cover 565 may include a first cover portion 5651 (e.g., the first cover portion 4651 of FIGS. 4A through 4C) having a first inner face F1, a second cover portion 5652 (e.g., the second cover portion 4652) having a second inner face F2, and a third cover portion 5653 (e.g., the third cover portion 4653) having a third inner face F3.

The first cover portion 5651 may include a first part 5651a connected to the second cover portion 5652 and the third cover portion 5653, and a second part 5651b connected to the first part 5651a and protruding from the first part 5651a toward an inner space of the hinge cover 565. The first part 5651a may have a pair of first flat faces F11 that is substantially flat. The second part 5651b may have a first convex face F12 that protrudes from the pair of the first flat faces F11 to be disposed substantially flat, and a pair of first inclined faces F13 between the pair of the first flat faces F11 and the first convex face F12. In an embodiment, the pair of the first flat faces F11, the first convex face F12, and the pair of the first inclined faces F13 may be substantially seamlessly connected to form a single surface.

In an embodiment, a substantially curved surface may be formed between at least one of the first flat faces F11 and at least one of the first inclined faces F13. In an embodiment, a substantially curved surface may be formed between the first convex face F12 and at least one of the first inclined faces F13.

In an embodiment, the first inclined faces F13 may have substantially the same inclination angle with respect to the pair of the first flat faces F11 and/or the first convex face F12. In an embodiment, the first inclined faces F13 may have different inclination angles. In an embodiment, in the second part 5651b, the pair of the first inclined faces F13 may be substantially perpendicular to at least one of the first flat faces F11 and/or the first convex face F12.

In an embodiment, the first cover portion 5651 may be symmetrical with respect to a virtual reference plane V3 including a folding axis A. For example, the first flat faces F11 may be symmetrical to each other with respect to the reference plane V3, and the first convex face F12 may be symmetrical with respect to the reference plane V3. In an embodiment, the first convex face F12 may have areas having substantially the same size that are formed as symmetrical with respect to the reference plane V3. In an embodiment, the first inclined faces F13 may be symmetrical with respect to the reference plane V3.

The FPCB 533 may include a rigid portion (e.g., the rigid portion 4331 of FIGS. 4A through 4C) having a face F4 substantially facing the first inner face F1, a first flexible portion 5332 (e.g., the first flexible portion 4332), and a second flexible portion 5333 (e.g., the second flexible portion 4333). A first virtual plane V1 including a point at which the rigid portion 5331 and the first flexible portion 5332 are connected may be defined between the rigid portion 5331 and the first flexible portion 5332. A second virtual plane V2 including a point at which the rigid portion 5331 and the second flexible portion 5333 are connected may be defined between the rigid portion 5331 and the second flexible portion 5333.

The face F4 of the rigid portion 5331 may have a shape complementary to that of the first inner face F1 of the first cover portion 5651 that the face F4 substantially faces. In an embodiment, the face F4 may include a pair of second flat faces F41 having a shape complementary to that of the pair of the first flat faces F1t and respectively facing the pair of the first flat faces F11, and a second curved face F42 between the pair of the second flat faces F41 facing the first convex face F12 and the pair of the first inclined faces F13. The second curved face F42 may include a second concave face F421 facing the first convex face F12 and having a shape complementary to that of the first convex face F12, and a pair of second inclined faces F422 that is each connected to the second concave face F421 and the pair of the second flat faces F41, faces the pair of the first inclined faces F13 respectively, and has a shape complementary to the shape of the pair of the first inclined faces F13 respectively.

Figure 6:
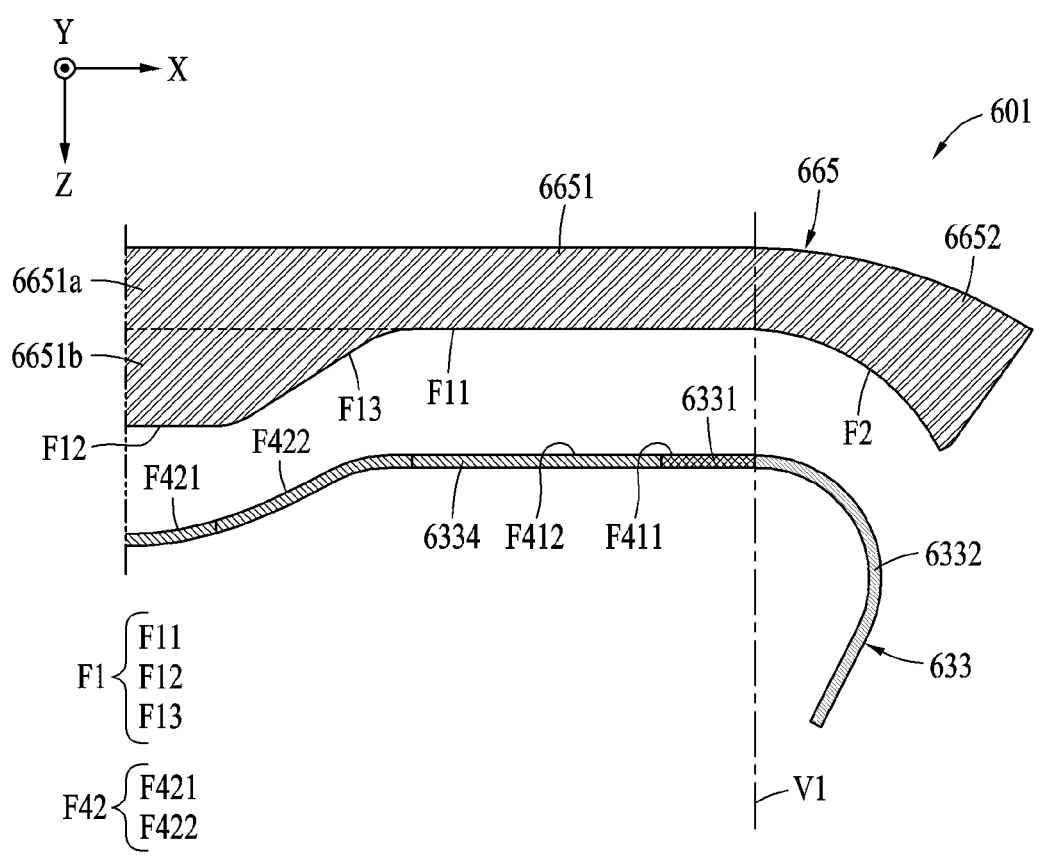
FIG. 6 is a view illustrating an example of a portion of a hinge cover and a portion of an FPCB according to an example embodiment.

Referring to FIG. 6, according to an embodiment, an electronic device 601 (e.g., the electronic device 501 of FIGS. 5A and 5B) may include a first housing (e.g., the first housing 310 of FIG. 3), a second housing (e.g., the second housing 320), a first bracket (e.g., the first bracket 531 of FIGS. 5A and 5B), a second bracket (e.g., the second bracket 532), an FPCB 633 (e.g., the FPCB 533), a first support body (e.g., the first support body 535), a second support body (e.g., the second support body 536), and a hinge cover 665 (e.g., the hinge cover 565). See also the above discussion of FIGS. 5A-5C regarding elements in FIG. 6.

The hinge cover 665 may include a first cover portion 6651 (e.g., the first cover portion 5651) having a first inner face F1, a second cover portion 6652 (e.g., the second cover portion 5652) having a second inner face F2, and a third cover portion (e.g., the third cover portion 5653) having a third inner face (e.g., the third inner face F3 of FIG. 5B). The first cover portion 6651 may include a first part 6651a (e.g., the first part 5651a) and a second part 6651b (e.g., the second part 5651b). The first part 6651a may have a pair of first flat faces F11, and the second part 6651b may have a first convex face F12 and a pair of first inclined faces F13.

The FPCB 633 may include a rigid portion 6331 (e.g., the rigid portion 5331), a first flexible portion 6332 (e.g., the first flexible portion 5332), and a second flexible portion (e.g., the second flexible portion 5333).

In an embodiment, the FPCB 633 may include a pair of rigid portions 6331 (or rigid segments) configured to be disposed on (directly or indirectly) the first cover portion 6651 in an unfolded state (e.g., a state of the electronic device 501 illustrated in FIG. 5A) of the electronic device 601, and a third flexible portion 6334 between the rigid portions 6331. Any one of the rigid portions 6331 may be adjacent to the first flexible portion 6332 and connected to the first flexible portion 6332, and the other one (not shown) of the rigid portions 6331 may be adjacent to the second flexible portion (e.g., the second flexible portion 5333) and connected to the second flexible portion. In the example of FIG. 6, unlike the example of FIGS. 5A through 5C, a portion between the first flexible portion 6332 and the second flexible portion of the FPCB 633 may not be formed entirely rigid, but portions respectively adjacent to the first flexible portion 6332 and the second flexible portion may be formed rigid.

The pair of the rigid portions 6331 may have a second flat face F412 facing a first flat face F11 and having a shape complementary to that of the first flat face F11.

In an embodiment, the third flexible portion 6334 may include a second flat face F412 facing a first flat face F11, a second concave face F421 facing the first convex face F12, and a pair of second inclined faces F422 respectively facing the pair of the first inclined faces F13. In an embodiment, the second concave face F421 may have a shape complementary to that of the first convex face F12. In an embodiment, the pair of the second inclined faces F422 may have a shape complementary to that of the pair of the first inclined faces F13.

Figure 7A:
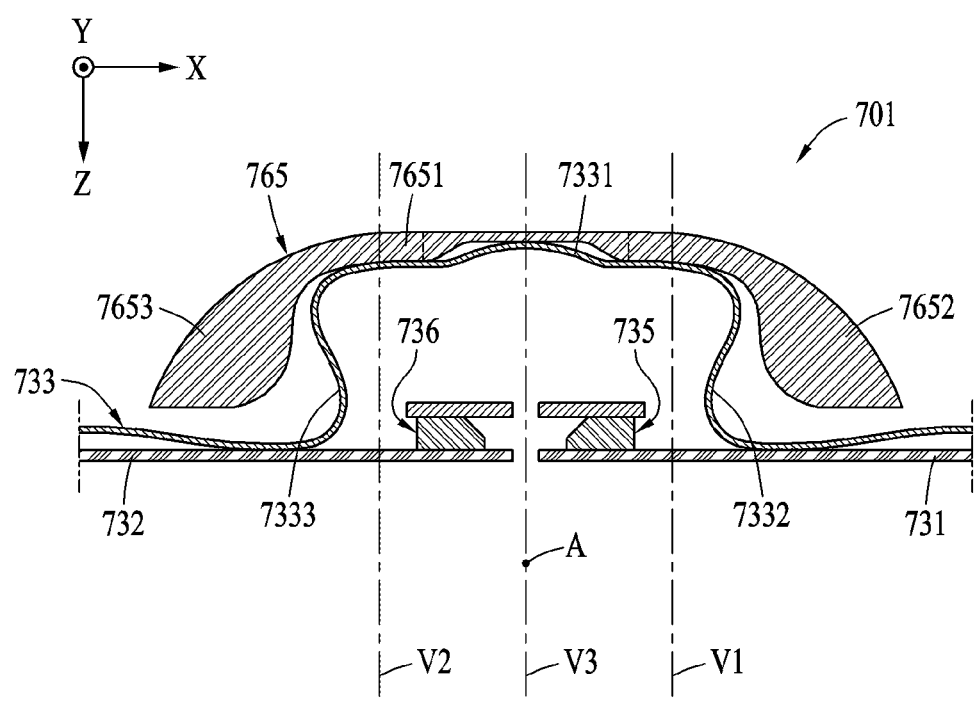
FIG. 7A is a cross-sectional view of an example electronic device in an unfolded state according to an example embodiment.
Figure 7B:
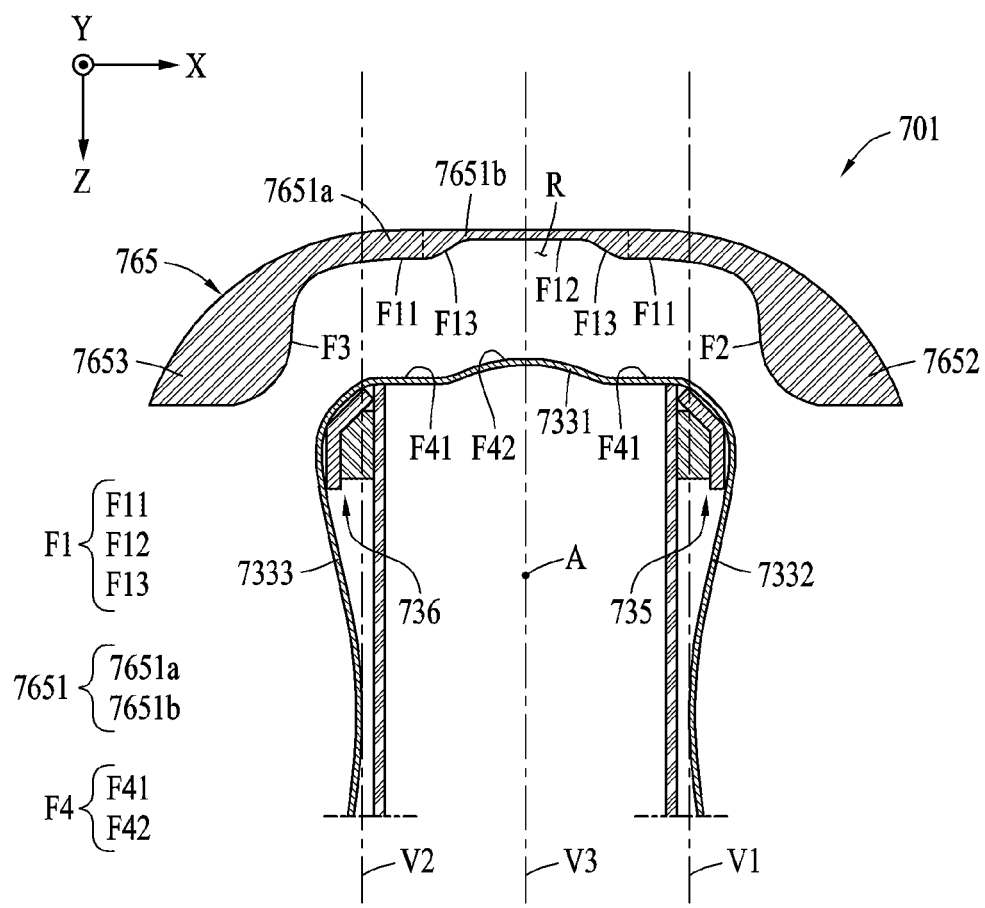
FIG. 7B is a cross-sectional view of an example electronic device in a folded state according to an example embodiment.
Figure 7C:
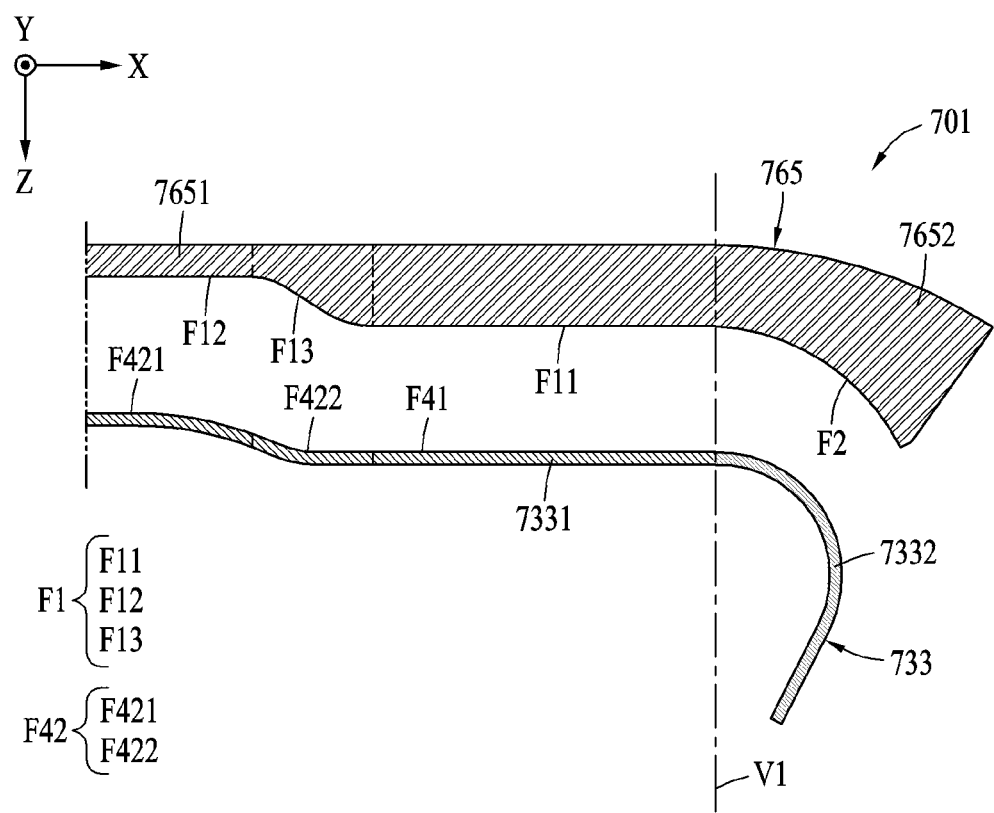
FIG. 7C is a view illustrating an example of a portion of a hinge cover and a portion of an FPCB according to an example embodiment.

Referring to FIGS. 7A, 7B, and 7C, according to an embodiment, an electronic device 701 (e.g., the electronic device 301 of FIG. 3) may include a first housing (e.g., the first housing 310), a second housing (e.g., the second housing 320), a first bracket 731 (e.g., the first bracket 331), a second bracket 732 (e.g., the second bracket 332), an FPCB 733 (e.g., the PCB 333), a first support body 735 (e.g., the first support body 435 of FIGS. 4A and 4B), a second support body 736 (e.g., the second support body 436 of FIGS. 4A and 4B), and a hinge cover 765 (e.g., the hinge cover 365 of FIG. 3 or the hinge cover 465 of FIGS. 4A through 4C).

The hinge cover 765 may include a first cover portion 7651 (e.g., the first cover portion 4651 of FIGS. 4A through 4C) having a first inner face F1, a second cover portion 7652 (e.g., the second cover portion 4652) having a second inner face F2, and a third cover portion 7653 (e.g., the third cover portion 4653) having a third inner face F3.

The first cover portion 7651 may include a first part 7651a connected to the second cover portion 7652 and the third cover portion 7653, and a second part 7651b connected to the first part 7651a and having a recessed portion R. The first part 7651a may have a pair of first flat faces F11 that is substantially flat. The recessed portion R of the second part 7651b may have a first concave face F12 that is substantially flat, and a pair of first inclined faces F13 between the pair of the first flat faces F11 and the first concave face F12. In an embodiment, the pair of the first flat faces F11, the first concave face F12, and the pair of the first inclined faces F13 may be substantially seamlessly connected to form a single surface.

In an embodiment, a substantially curved surface may be formed between at least one of the first flat faces F11 and at least one of the first inclined faces F13. In an embodiment, a substantially curved surface may be formed between the first concave face F12 and at least one of the first inclined faces F13.

In an embodiment, the first inclined faces F13 may have substantially the same inclination angle with respect to the pair of the first flat faces F11 and/or the first concave face F12. In an embodiment, the first inclined faces F13 may have different inclination angles. In an embodiment, in the second part 7651b, the pair of the first inclined faces F13 may be substantially perpendicular to at least one of the first flat faces F11 and/or the first concave face F12.

In an embodiment, the first cover portion 7651 may be symmetrical with respect to a virtual reference plane V3 including a folding axis A. The first flat faces F11 may be symmetrical to each other with respect to the reference plane V3. The first concave face F12 may be symmetrical with respect to the reference plane V3. In an embodiment, the first concave face F12 may have areas having substantially the same size that are formed as symmetrical with respect to the reference plane V3. In an embodiment, the pair of the first inclined faces F13 may be symmetrical with respect to the reference plane V3.

The FPCB 733 may include a rigid portion 7331 (e.g., the rigid portion 4331) having a face F4 substantially facing the first inner face F1, a first flexible portion 7332 (e.g., the first flexible portion 4332), and a second flexible portion 7333 (e.g., the second flexible portion 4333). A first virtual plane V1 including a point at which the rigid portion 7331 and the first flexible portion 7332 are connected may be defined between the rigid portion 7331 and the first flexible portion 7332. A second virtual plane V2 including a point at which the rigid portion 7331 and the second flexible portion 7333 are connected may be defined between the rigid portion 7331 and the second flexible portion 7333.

In an embodiment, the face F4 of the rigid portion 7331 may have a shape substantially complementary to that of the first inner face F1 of the first cover portion 7651 that the face F4 substantially faces. The face F4 may include a pair of second flat faces F41 having a shape complementary to a shape of the pair of the first flat faces F11 and respectively facing the pair of the first flat faces F11, and a second curved face F42 between first concave face F12 and the pair of the second flat faces F41 respectively facing the pair of the first inclined faces F13. The second curved face F42 may include a second convex face F421 facing the first concave face F12 and having a shape complementary to that of the first concave face F12, and a pair of second inclined faces F422 that is each connected to (directly or indirectly) the second convex face F421 and the pair of the second flat faces F41, faces the pair of the first inclined faces F13 respectively, and has a shape complementary to that of the pair of the first inclined faces F13 respectively.

Figure 8:
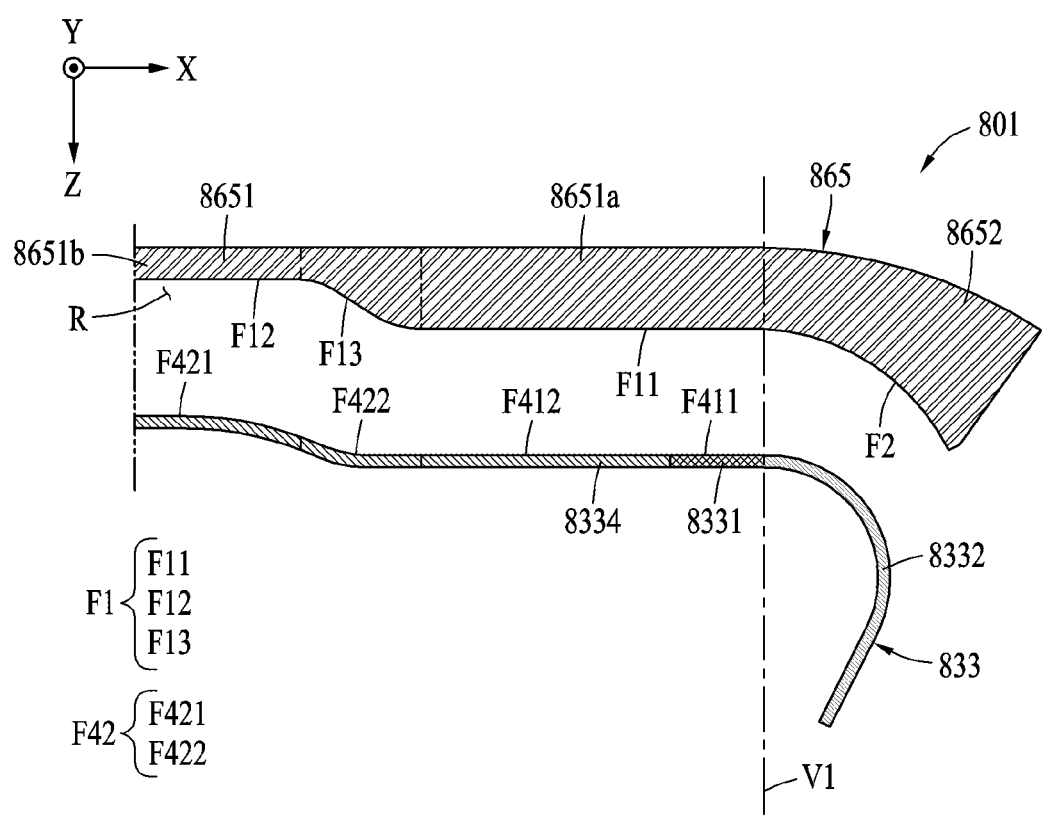
FIG. 8 is a view illustrating an example of a portion of a hinge cover and a portion of an FPCB according to an example embodiment.

Referring to FIG. 8, according to an embodiment, an electronic device 801 (e.g., the electronic device 701 of FIGS. 7A and 7B) may include a first housing (e.g., the first housing 310 of FIG. 3), a second housing (e.g., the second housing 320), a first bracket (e.g., the first bracket 731 of FIGS. 7A and 7B), a second bracket (e.g., the second bracket 732), an FPCB 833 (e.g., the FPCB 733), a first support body (e.g., the first support body 735), a second support body (e.g., the second support body 736), and a hinge cover 865 (e.g., the hinge cover 765). Note also the first virtual plane V1 and recessed portion R, in FIG. 8, discussed above in connection with other figures.

The hinge cover 865 may include a first cover portion 8651 (e.g., the first cover portion 7651) having a first inner face F1, a second cover portion 8652 (e.g., the second cover portion 7652) having a second inner face F2, and a third cover portion (e.g., the third cover portion 7653) having a third inner face (e.g., the third inner face F3 of FIG. 7B). The first cover portion 8651 may include a first part 8651a (e.g., the first part 7651a) and a second part 8651b (e.g., the second part 7651b). The first part 8651a may have a pair of first flat faces F11, and the second part 8651b may have a first concave face F12 and a pair of first inclined faces F13.

The FPCB 833 may include a rigid portion 8331 (e.g., the rigid portion 7331), a first flexible portion 8332 (e.g., the first flexible portion 7332), and a second flexible portion (e.g., the second flexible portion 7333).

In an embodiment, the FPCB 833 may include a pair of rigid portions 8331 (or rigid segments) configured to be disposed on (directly or indirectly) the first cover portion 8651 in an unfolded state (e.g., a state of the electronic device 701 illustrated in FIG. 7A) of the electronic device 801, and a third flexible portion 8334 between the rigid portions 8331. Any one of the rigid portions 8331 may be adjacent to the first flexible portion 8332 and connected to (directly or indirectly) the first flexible portion 8332, and the other one (not shown) of the rigid portions 8331 may be adjacent to the second flexible portion (e.g., the second flexible portion 5333) and connected to (directly or indirectly) the second flexible portion. In the example of FIG. 8, unlike the example of FIGS. 7A through 7C, a portion between the first flexible portion 8332 and the second flexible portion of the FPCB 833 may not be formed entirely rigid, but portions respectively adjacent to the first flexible portion 8332 and the second flexible portion may be formed rigid.

The pair of the rigid portions 8331 may have a second flat face F411 facing a first flat face F11 and having a shape complementary to that of the first flat face F11.

In an embodiment, the third flexible portion 8334 may include a second flat face F412 facing a first flat face F11, a second convex face F421 facing a first concave face F12, and a pair of second inclined faces F422 respectively facing a pair of first inclined faces F13. In an embodiment, the second convex face F421 may have a shape complementary to that of the first concave face F12. In an embodiment, the pair of the second inclined faces F422 may have a shape complementary to that of the pair of the first inclined faces F13.

Figure 9:
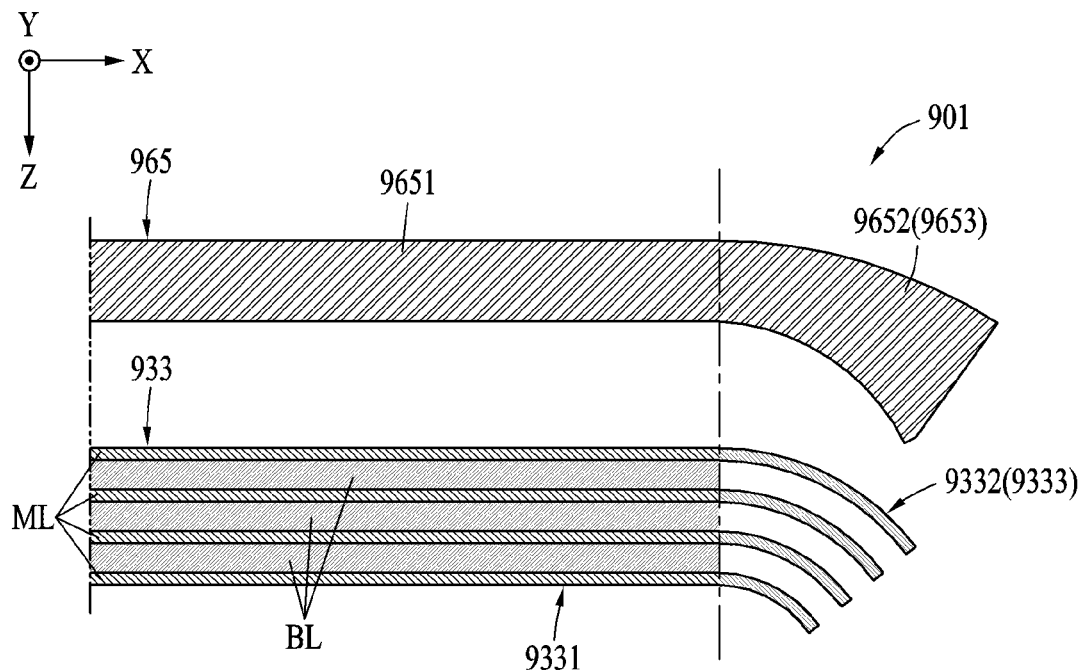
FIG. 9 is a view illustrating an example of a portion of a hinge cover and a portion of an FPCB according to an example embodiment.

Referring to FIG. 9, according to an embodiment, an electronic device 901 (e.g., the electronic device 401 of FIGS. 4A through 4C) may include a first housing (e.g., the first housing 310 of FIG. 3), a second housing (e.g., the second housing 320), a first bracket (e.g., the first bracket 331), a second bracket (e.g., the second bracket 332), an FPCB 933 (e.g., the PCB 333), a first support body (e.g., the first support body 435 of FIGS. 4A and 4B), a second support body (e.g., the second support body 436 of FIGS. 4A and 4B), and a hinge cover 965 (e.g., the hinge cover 465 of FIGS. 4A through 4C).

The FPCB 933 may include a rigid portion 9331 (e.g., the rigid portion 4331), a first flexible portion 9332 (e.g., the first flexible portion 4332), and a second flexible portion 9333 (e.g., the second flexible portion 4333). In an embodiment, the FPCB 933 may include a plurality of stacked metal layers (MLs). The metal layers may be each a copper-clad layer of which one or both surfaces are bonded by a dielectric.

The hinge cover 965 may include a first cover portion 9651 (e.g., the first cover portion 4651), a second cover portion 9652 (e.g., the second cover portion 4652), and a third cover portion 9653 (e.g., the third cover portion 4653).

In an embodiment, the rigid portion 9331 (e.g., the rigid portion 5331 of FIGS. 5A through 5C) may have a shape that is at least partially complementary to that of the hinge cover 965 (e.g., the hinge cover 565 of FIGS. 5A through 5C) having a convex structure. In an embodiment, the rigid portion 9331 (e.g., the rigid portion 7331 of FIGS. 7A through 7C) may have a shape that is at least partially complementary to that of the hinge cover 965 (e.g., the hinge cover 765 of FIGS. 7A through 7C) having a concave structure.

In an embodiment, in the rigid portion 9331, a prepreg may not be applied between a pair of adjacent metal layers. The rigid portion 9331 may include a plurality of hardening portions (e.g., bonding layers (BLs)) that contacts a pair of adjacent metal layers and is configured to harden the pair of the adjacent metal layers. The hardening portions may include a viscous adhesive, for example. For example, the FPCB 933 may be manufactured by applying the viscous adhesive between a pair of adjacent metal layers when manufacturing the FPCB 933, or the FPCB 933 including the rigid portion 9331 may be manufactured as the adhesive is hardened by adding a portion to which the adhesive is applied to a frame forming a preset shape before the portion (e.g., the rigid portion 9331) is hardened.

Figure 10:
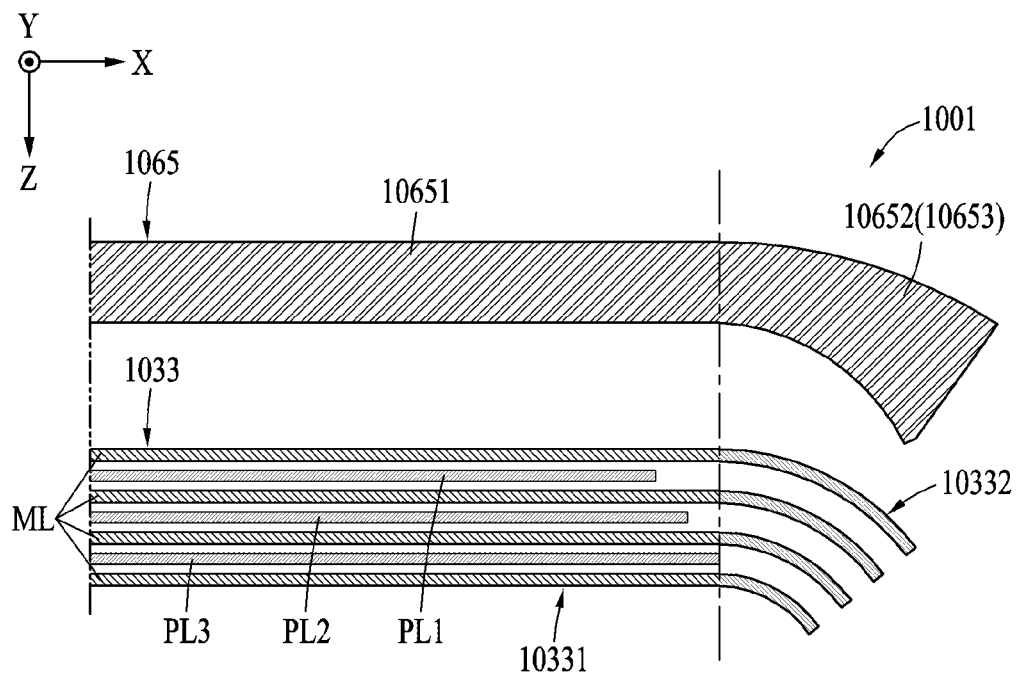
FIG. 10 is a view illustrating an example of a portion of a hinge cover and a portion of an FPCB according to an example embodiment.

Referring to FIG. 10, according to an embodiment, an electronic device 1001 (e.g., the electronic device 401 of FIGS. 4A through 4C) may include a first housing (e.g., the first housing 310 of FIG. 3), a second housing (e.g., the second housing 320), a first bracket (e.g., the first bracket 331), a second bracket (e.g., the second bracket 332), an FPCB 1033 (e.g., the PCB 333), a first support body (e.g., the first support body 435 of FIGS. 4A and 4B), a second support body (e.g., the second support body 436 of FIGS. 4A and 4B), and a hinge cover 1065 (e.g., the hinge cover 465 of FIGS. 4A through 4C).

The FPCB 1033 may include a rigid portion 10331 (e.g., the rigid portion 4331), a first flexible portion 10332 (e.g., the first flexible portion 4332), and a second flexible portion (e.g., the second flexible portion 4333). The FPCB 1033 may include a plurality of metal layers (MLs) stacked in one direction (e.g., a +/−Z direction).

The hinge cover 1065 may include a first cover portion 10651 (e.g., the first cover portion 4651), a second cover portion 10652 (e.g., the second cover portion 4652), and a third cover portion 10653 (e.g., the third cover portion 4653).

In an embodiment, the rigid portion 10331 may include a plurality of prepreg layers PL1, PL2, and PL3 each disposed between a pair of adjacent metal layers. When viewed in a stacking direction in which a pair of metal layers is stacked (e.g., a direction receding from the first cover portion 10651, or a +Z direction), an interval length (e.g., an X-direction length) of a first prepreg layer PL1 disposed between one pair of metal layers may be less than an interval length of a second prepreg layer PL2 disposed between a subsequent pair of metal layers. In an embodiment, when viewed in a stacking direction in which a pair of metal layers is stacked (e.g., the direction receding from the first cover portion 10651, or the +Z direction), respective interval lengths of the prepreg layers PL1, PL2, and PL3 may increase sequentially. Such a sequential increase in the interval lengths of the prepreg layers PL1, PL2, and PL3 may reduce a stress to be applied to the FPCB 1033 and may form a naturally curved shape of the FPCB 1033.

According to an embodiment, an electronic device (e.g., 301 and 401) may include: a first housing (e.g., 310), a second housing (e.g., 320), a hinge cover (e.g., 365 and 465) disposed between the first housing 310 and the second housing 320 and including a first cover portion (e.g., 4651), a second cover portion (e.g., 4652) at a first side of the first cover portion 4651, and a third cover portion (e.g., 4653) at a second side of the first cover portion 4651 opposite to the first side, a hinge structure (e.g., 334) disposed on (directly or indirectly) the hinge cover 365/465 and configured to rotate the first housing 310 and the second housing 320 between a folded state in which the first housing 310 and the second housing 320 form a first angle and an unfolded state in which the first housing 310 and the second housing 320 form a second angle greater than the first angle, a display (e.g., 361) including a first area (e.g., 361a) disposed on the first housing 310, a second area (e.g., 361b) disposed on the second housing 320, and a flexible area (e.g., 361c) disposed between the first area 361a and the second area 361b, and an FPCB (e.g., 333 and 433) including a rigid portion (e.g., 4331) configured to be disposed on the first cover portion 4651 in the folded state, a first flexible portion (e.g., 4332) connected to the rigid portion 4331 and configured to be at least partially bent along the second cover portion 4652, and a second flexible portion (e.g., 4333) connected to (directly or indirectly) the rigid portion 4331 oppositely to the first flexible portion 4332 and configured to be at least partially bent along a third cover portion (e.g., 4653).

In an embodiment, a first virtual plane V1 may be defined between the rigid portion 4331 and the first flexible portion 4332, and a second virtual plane V2 may be defined between the rigid portion 4331 and the second flexible portion 4333 (e.g., see FIG. 4A). In addition, the rigid portion 4331 may be configured to be move in a space between the first virtual plane V1 and the second virtual plane V2, between the unfolded state and the folded state.

In an embodiment, the first virtual plane V1 and the second virtual plane V2 may be substantially parallel to each other (e.g., see FIG. 4A).

In an embodiment, the flexible area 361c may include a folding axis A, and a reference plane V3 including the folding axis A may be defined between the first virtual plane V1 and the second virtual plane V2. In addition, the rigid portion 4331 may be configured to maintain a substantially symmetrical shape with respect to the reference plane V3, between the unfolded state and the folded state.

In an embodiment, the rigid portion 4331 may include a face F4 having a shape that is at least partially complementary to a shape of an inner face F1 of the first cover portion 4651.

In an embodiment, the inner face F1 of the first cover portion 4651 may include a first flat face, and the rigid portion 4331 may include a second flat face complementary to the first flat face.

In an embodiment, the inner face F1 of the first cover portion (e.g., 5651) may further include a first convex face F12, and the rigid portion (e.g., 5331) may further include a second concave face F421 complementary to the first convex face F12.

In an embodiment, The inner face F1 of the first cover portion 5651 may further include a pair of first inclined faces F13 between a first flat face F11 and the first convex face F12, and the rigid portion 5331 may further include a pair of second inclined faces F422 respectively complementary to the pair of the first inclined faces F13.

In an embodiment, the rigid portion (e.g., 9331) may include a plurality of stacked metal layers (MLs), and a plurality of hardening portions (or bonding layers (BLs)) that is each disposed between a pair of adjacent metal layers, contacts the pair of the adjacent metal layers, and hardens the pair of the adjacent metal layers.

In an embodiment, the rigid portion (e.g., 10331) may include a plurality of stacked metal layers (MLs), and a plurality of prepregs PL1, PL2, and PL3 each disposed between a pair of adjacent metal layers. When viewed in a direction receding from the first cover portion (e.g., 10651) and in a stacking direction in which the metal layers are stacked, a length of a first prepreg PL1 among the prepregs PL1, PL2, and PL3 may be less than a length of a subsequent second prepreg PL2 of the first prepreg PL1.

In an embodiment, the inner face F1 of the first cover portion (e.g., 7651) may include a first flat face F11 and a first concave face F12, and the rigid portion (e.g., 7331) may include a second convex face F421 complementary to the first concave face F12.

The inner face F1 of the first cover portion 7651 may further include a pair of first inclined faces F13 between the first flat face F11 and the first concave face F12, and the rigid portion 7331 may further include a pair of second inclined faces F422 respectively complementary to the pair of the first inclined faces F13.

In an embodiment, the rigid portion may include a first rigid segment (e.g., 6331 and 8331) adjacent to the first flexible portion (e.g., 6332 and 8332), and a second rigid segment adjacent to the second flexible portion.

In an embodiment, the FPCB (e.g., 633 and 833) may further include a third flexible portion (e.g., 6334 and 8334) between the first rigid segment (e.g., 6331 and 8331) and the second rigid segment.

In an embodiment, the FPCB (e.g., 333 and 433) may include a rigid portion (e.g., 4331), a first flexible portion (e.g., 4332) connected to the rigid portion 4331 and configured to be at least partially bent, and a second flexible portion (e.g., 4333) connected to the rigid portion 4331 oppositely to the first flexible portion 4332 and configured to be at least partially bent.

In an embodiment, the rigid portion (e.g., 9331) may include a plurality of stacked metal layers (MLs), and a plurality of hardening portions (or bonding layers (BLs)) that is each disposed between a pair of adjacent metal layers, contacts the pair of the adjacent metal layers, and hardens the pair of the adjacent metal layers.

In an embodiment, the rigid portion (e.g., 10331) may include a plurality of stacked metal layers (MLs), and a plurality of prepregs PL1, PL2, and PL3 each disposed between a pair of adjacent metal layers. When viewed in a stacking direction in which the metal layers are stacked, a length of a first prepreg PL1 among the prepregs PL1, PL2, and PL3 may be less than a length of a subsequent second prepreg (e.g., PL2) of the first prepreg (e.g., PL1) among the prepregs PL1, PL2, and PL3.

In an embodiment, the rigid portion may include a first rigid segment (e.g., 6331 and 8331) adjacent to the first flexible portion (e.g., 6332 and 8332), and a second rigid segment adjacent to the second flexible portion.

In an embodiment, the FPCB (e.g., 633 and 833) may further include a third flexible portion (e.g., 6334 and 8334) between the first rigid segment (e.g., 6331 and 8331) and the second rigid segment.

According to an embodiment, an electronic device (e.g., 301 and 401) may include: a first housing (e.g., 310), a second housing (e.g., 320), a hinge cover (e.g., 365 and 465) disposed between the first housing 310 and the second housing 320 and including a first cover portion (e.g., 4651), a second cover portion (e.g., 4652) at a first side of the first cover portion 4651, and a third cover portion (e.g., 4653) at a second side of the first cover portion 4651 opposite to the first side, a hinge structure (e.g., 334) disposed on the hinge cover 365/465 and configured to rotate the first housing 310 and the second housing 320, between a folded state in which the first housing 310 and the second housing 320 form a first angle and an unfolded state in which the first housing 310 and the second housing 320 form a second angle greater than the first angle, a display (e.g., 361) including a first area (e.g., 361a) disposed on the first housing 310, a second area (e.g., 361b) disposed on the second housing 320, and a flexible area (e.g., 361c) disposed between the first area 361a and the second area 361b, and an FPCB (e.g., 333 and 433) including a first bracket (e.g., 331 and 431) disposed between the first area 361a and the first housing 310, a second bracket (e.g., 332 and 432) disposed between the second area 361b and the second housing 320, a rigid portion (e.g., 4331) configured to be disposed on the first cover portion 4651 in the folded state, a first flexible portion (e.g., 4332) disposed between the first bracket 331/431 and the second cover portion 4652, connected to the rigid portion 4331, and configured to be at least partially bent along the second cover portion 4652, and a second flexible portion (e.g., 4333) disposed between the second bracket 332/432 and the third cover portion 4653, connected to the rigid portion 4331 oppositely to the first flexible portion 4332, and configured to be at least partially bent along the third cover portion (e.g., 4653).

What is claimed is:

1. An electronic device, comprising:
   a first housing;
   a second housing;
   a hinge cover disposed between at least the first housing and the second housing, and comprising a first cover portion, a second cover portion at a first side of the first cover portion, and a third cover portion at a second side of the first cover portion opposite to the first side;
   a hinge structure disposed on the hinge cover, and configured to rotate the first housing and/or the second housing, between a folded state in which the first housing and the second housing form a first angle and an unfolded state in which the first housing and the second housing form a second angle greater than the first angle;
   a display comprising a first area for the first housing, a second area for the second housing, and a flexible area between at least the first area and the second area; and
   a flexible printed circuit board (FPCB) comprising a rigid portion configured to be disposed on the first cover portion in the unfolded state, a first flexible portion connected to the rigid portion and configured to be at least partially bent along the second cover portion, and a second flexible portion connected to the rigid portion opposite to the first flexible portion and configured to be at least partially bent along the third cover portion,
   wherein the rigid portion is more rigid than the first flexible portion and the second flexible portion,
   wherein a first virtual plane is defined between the rigid portion and the first flexible portion, and a second virtual plane is defined between the rigid portion and the second flexible portion, and
   wherein the rigid portion is configured to move toward and away from the first cover portion in a space between the first virtual plane and the second virtual plane, between the unfolded state and the folded state.

2. The electronic device of claim 1, wherein the first virtual plane and the second virtual plane are substantially parallel to each other.

3. The electronic device of claim 1, wherein the flexible area has a folding axis, and a reference plane comprising the folding axis is defined between the first virtual plane and the second virtual plane,
   wherein the rigid portion is configured to maintain substantially symmetrical with respect to the reference plane, between the unfolded state and the folded state.

4. The electronic device of claim 1, wherein the rigid portion comprises a face having a shape that is at least partially complementary to a shape of an inner face of the first cover portion.

5. The electronic device of claim 4, wherein the inner face of the first cover portion comprises a first flat face, and the rigid portion comprises a second flat face complementary to the first flat face.

6. The electronic device of claim 5, wherein the inner face of the first cover portion further comprises a first convex face, and the rigid portion further comprises a second concave face complementary to the first convex face.

7. The electronic device of claim 6, wherein the inner face of the first cover portion further comprises a pair of first inclined faces between the first flat face and the first convex face, and the rigid portion further comprises a pair of second inclined faces respectively complementary to the first inclined faces.

8. The electronic device of claim 6, wherein the rigid portion comprises:
   a plurality of stacked metal layers; and
   a plurality of hardening portions each disposed between a pair of adjacent metal layers among the metal layers, wherein each of the hardening portions is configured to bond a pair of adjacent metal layers among the metal layers and harden the pair of adjacent metal layers.

9. The electronic device of claim 6, wherein the rigid portion comprises:
   a plurality of stacked metal layers; and
   a plurality of prepregs each disposed between a pair of adjacent metal layers among the metal layers,
   wherein, when viewed in a direction receding from the first cover portion and in a stacking direction in which the metal layers are stacked, a length of a first prepreg among the prepregs is less than a length of a subsequent second prepreg of the first prepreg among the prepregs.

10. The electronic device of claim 4, wherein the inner face of the first cover portion comprises a first flat face and a first concave face, and the rigid portion comprises a second convex face complementary to the first concave face.

11. The electronic device of claim 10, wherein the inner face of the first cover portion further comprises a pair of first inclined faces between the first flat face and the first concave face, and the rigid portion further comprises a pair of second inclined faces respectively complementary to the first inclined faces.

12. The electronic device of claim 1, wherein the rigid portion comprises:
   a first rigid segment adjacent to the first flexible portion; and
   a second rigid segment adjacent to the second flexible portion.

13. The electronic device of claim 12, wherein the FPCB further comprises a third flexible portion between the first rigid segment and the second rigid segment.

* * * * *